(12) United States Patent
Kleiman-Weiner et al.

(10) Patent No.: US 11,790,009 B2
(45) Date of Patent: *Oct. 17, 2023

(54) KNOWLEDGE OPERATING SYSTEM

(71) Applicant: salesforce.com, inc., San Francisco, CA (US)

(72) Inventors: Max Kleiman-Weiner, Cambridge, MA (US); Andrew Richard Gallant, Westborough, MA (US); Jason Rastrick Briggs, Boston, MA (US); Cogan Dwayne Culver, Stafford, VA (US); Kevin John Doyle, Somerville, MA (US); Thomas Michael DuBois, Columbia, MD (US); John Randolph Frank, Cambridge, MA (US); Keith Michael Gabryelski, Brookline, MA (US); Andrew Wilson Haskell, Manchester-by-the-Sea, MA (US); David Zachary Maze, Somerville, MA (US); Geoffrey Ira Milstein, Merrimac, MA (US); Emily Brooks Pavlini, Boston, MA (US); Daniel Adam Roberts, Cambridge, MA (US); Aaron Michael Taylor, Williamstown, MA (US); Henry Forrest Leanna Wallace, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/460,613

(22) Filed: Aug. 30, 2021

(65) Prior Publication Data

US 2022/0058220 A1 Feb. 24, 2022

Related U.S. Application Data

(63) Continuation of application No. 16/001,884, filed on Jun. 6, 2018, now Pat. No. 11,106,741.

(Continued)

(51) Int. Cl.
*G06F 16/904* (2019.01)
*G06N 5/00* (2023.01)
(Continued)

(52) U.S. Cl.
CPC ........ *G06F 16/904* (2019.01); *G06F 16/9024* (2019.01); *G06F 16/93* (2019.01);
(Continued)

(58) Field of Classification Search
CPC .. G06F 16/9535; G06F 16/93; G06F 16/9024; G06F 16/904; G06N 5/00; G06N 5/022
(Continued)

(56) References Cited

U.S. PATENT DOCUMENTS 5,659,732 A 8/1997 Kirsch
5,673,369 A 9/1997 Kim
(Continued)

FOREIGN PATENT DOCUMENTS

CN 1965314 5/2007
CN 101470747 7/2009
(Continued)

OTHER PUBLICATIONS

Popov et al., "Connecting the Dots: A Multi-pivot Approach to Data Exploration", 2011 (Year: 2011).
(Continued)

*Primary Examiner* — Robert W Beausoliel, Jr.
*Assistant Examiner* — Pedro J Santos
(74) *Attorney, Agent, or Firm* — Butzel Long

(57) ABSTRACT

A journal of operations persistently stores a collection of user and machine interactions with documents, concepts
(Continued)

within documents, and relationships/mentions among such documents and concepts. A knowledge graph or other visual expression can be used to provide an interactive format for user interactions with this information, and to visually display the accumulated information in the journal of operations on user's device of choice. Such accumulations are often called aggregations or aggregates. Both human users and computer users such as automated recommendation engines, machine learning algorithms, and the like can interact with the journal of operations to facilitate computer-assisted discovery and organization of data around a topic of interest to the human user. The resulting journal of operations and aggregations of those operations such as a knowledge graph or other visual expression(s) also provides a useful medium for sharing knowledge with other users and collaborating on investigation of a topic.

20 Claims, 7 Drawing Sheets

Related U.S. Application Data

(60) Provisional application No. 62/516,052, filed on Jun. 6, 2017.

(51) Int. Cl.
  G06F 16/93 (2019.01)
  G06F 16/9535 (2019.01)
  G06N 5/022 (2023.01)
  G06N 20/00 (2019.01)
  G06F 16/901 (2019.01)

(52) U.S. Cl.
  CPC ......... *G06F 16/9535* (2019.01); *G06N 5/00* (2013.01); *G06N 5/022* (2013.01); *G06N 20/00* (2019.01)

(58) Field of Classification Search
  USPC ....................................................... 707/748
  See application file for complete search history.

(56) References Cited

U.S. PATENT DOCUMENTS

| | | | |
|---|---|---|---|
| 5,748,954 A | 5/1998 | Mauldin | |
| 5,764,906 A | 6/1998 | Edelstein | |
| 5,836,771 A | 11/1998 | Ho | |
| 5,873,107 A | 2/1999 | Borovoy | |
| 5,884,302 A | 3/1999 | Ho | |
| 5,924,090 A | 7/1999 | Krellenstein | |
| 5,934,910 A | 8/1999 | Ho | |
| 6,112,203 A | 8/2000 | Bharat | |
| 6,138,113 A | 10/2000 | Dean | |
| 7,401,057 B2 | 7/2008 | Eder | |
| 7,962,500 B2 | 6/2011 | Van Zwol | |
| 8,122,019 B2 | 2/2012 | Lucovsky | |
| 8,402,029 B2 | 3/2013 | Valdes-Perez | |
| 8,429,173 B1 | 4/2013 | Rosenberg | |
| 8,533,223 B2 | 9/2013 | Houghton | |
| 8,543,649 B2 | 9/2013 | Gilmour | |
| 8,577,911 B1 | 11/2013 | Stepinski | |
| 8,635,197 B2 | 1/2014 | Chaturvedi | |
| 8,751,505 B2 | 6/2014 | Carmel | |
| 8,949,204 B2 | 2/2015 | Chaturvedi | |
| 9,047,278 B1 | 6/2015 | Mann | |
| 9,081,814 B1 | 7/2015 | Carroll | |
| 9,275,132 B2 | 3/2016 | Roberts | |
| 9,436,766 B1* | 9/2016 | Buryak | G06F 16/35 |
| 10,474,708 B2 | 11/2019 | Roberts | |
| 10,839,021 B2 | 11/2020 | Kleiman-Weiner | |
| 2003/0126136 A1 | 7/2003 | Omoigui | |
| 2003/0177112 A1 | 9/2003 | Gardner | |
| 2003/0187844 A1 | 10/2003 | Li | |
| 2006/0116994 A1 | 6/2006 | Jonker | |
| 2007/0067285 A1 | 3/2007 | Blume | |
| 2007/0130126 A1 | 6/2007 | Lucovsky | |
| 2007/0198948 A1 | 8/2007 | Toriyama | |
| 2007/0203693 A1 | 8/2007 | Estes | |
| 2007/0208719 A1 | 9/2007 | Tran | |
| 2007/0214114 A1 | 9/2007 | Liu | |
| 2008/0104103 A1 | 5/2008 | Adams | |
| 2008/0222105 A1 | 9/2008 | Matheny | |
| 2009/0019031 A1 | 1/2009 | Krovitz | |
| 2009/0240744 A1 | 9/2009 | Thomson | |
| 2009/0290813 A1 | 11/2009 | He | |
| 2009/0297050 A1 | 12/2009 | Li | |
| 2011/0029559 A1 | 2/2011 | Kikuchi | |
| 2011/0085739 A1 | 4/2011 | Zhang | |
| 2011/0313990 A1 | 12/2011 | Valdes-Perez | |
| 2012/0036125 A1 | 2/2012 | Al-Kofahi | |
| 2012/0158633 A1 | 6/2012 | Eder | |
| 2012/0192055 A1 | 7/2012 | Antebi | |
| 2013/0080457 A1 | 3/2013 | Narayanan | |
| 2013/0138661 A1 | 5/2013 | Lu | |
| 2013/0138669 A1 | 5/2013 | Lu | |
| 2013/0346396 A1 | 12/2013 | Stamm | |
| 2014/0040275 A1 | 2/2014 | Jiangbo | |
| 2014/0129535 A1 | 5/2014 | Riley | |
| 2014/0173426 A1 | 6/2014 | Huang | |
| 2015/0324454 A1 | 11/2015 | Roberts | |
| 2015/0356093 A1* | 12/2015 | Abbas | G06F 16/9535 707/748 |
| 2016/0012126 A1* | 1/2016 | Franceschini | G06F 16/325 707/735 |
| 2016/0012336 A1 | 1/2016 | Franceschini | |
| 2016/0246784 A1* | 8/2016 | Chakerian | G06F 16/289 |
| 2016/0378855 A1 | 12/2016 | Roberts | |
| 2018/0189708 A1 | 7/2018 | Senapaty | |
| 2018/0349511 A1 | 12/2018 | Kleiman-Weiner | |
| 2018/0349517 A1 | 12/2018 | Kleiman-Weiner | |
| 2020/0320111 A1 | 10/2020 | Roberts | |

FOREIGN PATENT DOCUMENTS

| | | |
|---|---|---|
| WO | 02054292 | 7/2002 |
| WO | 2003005235 | 1/2003 |
| WO | 2005111868 | 11/2005 |
| WO | 2006031741 | 3/2006 |
| WO | 2006035196 | 4/2006 |
| WO | 2012109083 | 8/2012 |
| WO | 2015175548 | 11/2015 |

OTHER PUBLICATIONS

Nešić et al., "Extending MS Office for sharing Document Content Units over the Semantic Web", 2008 (Year: 2008).
Fakultät et al., "A Semantics-based User Interface Model for Content Annotation, Authoring and Exploration", 1984 (Year: 1984).
Chekima et al., "Document Recommender Agent Based on Hybrid Approach", 2014 (Year: 2014).
Marivate et al., "An Intelligent Multi-Agent Recommender System for Human Capacity Building", 2007 (Year: 2007).
Nešić, "Semantic Document Model to Enhance Data and Knowledge Interoperability", 2010 (Year: 2010).
Marie, "Linked data based exploratory search", 2015 (Year: 2015).
Cordier et al., "Trace-Based Reasoning—Modeling Interaction Traces for Reasoning on Experiences", 2013 (Year 2013).
Sauermann et al., "Overview and Outlook on the Semantic Desktop", 2005 (Year: 2005).
Eck et al., "Intelligent User Interfaces with Adaptive Knowledge Assistants", 2009 (Year: 2009).
Chen et al., "A Distributed Multi-Agent System for Collaborative Information Management and Sharing", 2000 (Year: 2000).
Fellner et al., "Adaptive Semantics Visualization", 2014 (Year: 2014).
Nešić, "Semantic Document Architecture for Desktop Data Integration and Management", 2010 (Year: 2010).

(56) References Cited

OTHER PUBLICATIONS

Kboubi et al., "Semantic Visualization and Navigation In Textual Corpus", 2010 (Year: 2010).
Morais et al., "A Multi-Agent Recommender System", 2012 (Year: 2012).
ISA, "PCT Application No. PCT/US18/36345 International Search Report and Written Opinion dated Aug. 31, 2018", 11 pages.
Archagon, "Data Laced with History: Causal Trees & Operational CRDTs", http://archagon.net/blog/2018/03/24/data-laced-with-history/ Mar. 24, 2018, 65 pages.
Grishchenko, Victor, "Deep Hypertext with Embedded Revision Control Implemented in Regular Expressions", Grishchenko, Victor S . . . "Deep hypertext with embedded revision control implemented in regular expressions." Int. Sym. Wikis (2010). Jul. 2010, 10 pages.
Winkler, Rolfe , "Getting More than Just Words in a Google Search Result", The Wall Street Journal Aug. 19, 2014 , 1 Page.
"Help: Infobox", Wikipedia—https://en.wikipedia.org/wiki/help:infobox Mar. 5, 2015, 6 Pages.
KBA, "TREC KBA 2014: Technical Details", TREC Knowledge Base Acceleration 2014, 2 Pages.
"VisualEditor", MediaWiki.org—https://www.mediawiki.org/wiki/visualeditor May 15, 2011, 4 pages.
"Recommender System", Wikipedia—https://en.wikipedia.org/wiki/recommender_systems May 2, 2015, 13 Pages.
"Wikipedia: User Scripts", Wikipedia—http://en.wikipedia.org/wiki/wikipedia:user_scripts May 2, 2015, 26 Pages.
Shapiro, Marc et al., "A comprehensive study of Convergent and Commutative Replicated Data Types", Inria—Centre Paris-Rocquencourt; INRIA. Jan. 13, 2011 , 51 Pages.
Spiewak, Daniel , "Understanding and Applying Operational Transformation", http://www.codecommit.com/blog/java/understanding-and-applying-operational-transformation. Understanding and Applying Operational Transformation . May 17, 2010, 11 Pages Total.
"U.S. Appl. No. 15/055,984 Non-Final Office Action dated Jul. 9, 2018", 18 pages.
"U.S. Appl. No. 14/710,342, Non-Final Office Action dated Jun. 16, 2015", 19 pages.
"U.S. Appl. No. 14/710,342, Final Office Action dated Nov. 10, 2015", 20 pages.
"U.S. Appl. No. 14/710,342, Notice of Allowance dated Jan. 15, 2016", 17 pages.
Shapiro, Marc , "Conflict-free Replicated Data Types", Marc Shapiro, Nuno Pregui,ca, Carlos Baquero, Marek Zawirski. Conflict-free Replicated Data Types. [Research Report] RR-7687, INRIA. 2011, pp. 18. , 22 Pages Total.
Fraser, Neil , "Differential Synchronization", Differential Synchronization by Neil Fraser, Jan. 2009. Google. , 8 Pages Total.
EPO, "EP Application Serial No. 15792362.4, Extended Search Report dated Sep. 6, 2017", 9 pages.
U.S. Searching Authority, "International Application Serial No. PCT/US15/30400, Search Report and Written Opinion dated Aug. 27, 2015", 9 pages.
Weiss, Stephane et al., "Logoot-Undo: Distributed Collaborative Editing System on P2P networks", Logoot-Undo: Distributed Collaborative Editing System on P2P networks Stephane Weiss, Pascal Urso, Pascal Molli Nancy-Université, Loria, France , 14 Pages Total.
Ahmend-Nacer, Mehdi et al., "Merging OT and CRDT Algorithms", Mehdi Ahmed-Nacer, Pascal Urso, Valter Balegas, Nuno Pregui,ca. Merging OT and CRDT Algorithms. 1st Workshop on Principles and Practice of Eventual Consistency (PaPEC), Apr. 2014, Amsterdam, Netherlands. 2014, . , 4 Pages Total.
WIPO, "PCT Application No. PCT/US15/30400 International Preliminary Report on Patentability dated Nov. 15, 2016", 7 pages.
Oster, Gerald et al., "Real time group editors without Operational transformation", G'erald Oster, Pascal Urso, Pascal Molli, Abdessamad Imine. Real time group editors without Operational transformation. [Research Report] RR-5580, INRIA. 2005, pp. 24. , 28 Pages Total.

Burckhardt, Sebastian et al., "Replicated Data Types: Specification, Verification, Optimality", Replicated Data Types: Specification, Verification, Optimality. POPL 2014: 41st ACM SIGPLAN—SIGACT Symposium on Principles of Programming Languages, Jan. 2014, San Diego, CA, United States. ACM, pp. 271-284, 2014 , 15 Pages Total.
Attiya, Hagit et al., "Specification and Complexity of Collaborative Text Editing", PODC'16, Jul. 25-28, 2016, Chicago, IL, USA. ISBN 978-1-4503-3964—Mar. 16, 2007. DOI: http://dxdoi.org/10.1145/2933057.2933090 , 10 Pages Total.
Lamport, Leslie , "Time, Clocks, and the Ordering of Events in a Distributed System", Massachusetts Computer Associates, Inc. Jul. 1978 vol. 21 No. 7 , pp. 558-565.
Levien, Raph , "Towards a unified theory of Operational Transformation and CRDT", Jul. 6, 2016.https://medium.com/@raphlinus/towards-a-unified-theory-of-operational-transformation-and-crdt-70485876f72f , 9 Pages Total.
WIPO, "PCT Application No. PCT/US18/36345 International Preliminary Report on Patentability dated Dec. 19, 2019", 10 pages.
"U.S. Appl. No. 16/001,884, Non-Final Office Action dated May 15, 2020", 23 pages.
"U.S. Appl. No. 16/001,874 Non-Final Office Action dated Sep. 28, 2018", 42 pages.
"U.S. Appl. No. 16/001,874 Non-Final Office Action dated Sep. 18, 2019", 30 pages.
"U.S. Appl. No. 16/001,874 Final Office Action dated May 1, 2019", 10 pages.
"U.S. Appl. No. 16/001,874 Notice of Allowance dated Jun. 22, 2020", 15 pages.
"U.S. Appl. No. 16/001,874 Notice of Allowance dated Oct. 7, 2020", 7 pages.
"U.S. Appl. No. 15/055,984 Final Office Action dated Apr. 4, 2019", 17 pages.
"U.S. Appl. No. 15/055,984 Notice of Allowance dated Oct. 2, 2019", 13 pages.
WIPO, "Application No. PCT/US19/39051 International Preliminary Report on Patentability dated Jan. 7, 2021", 13 pages.
CNIPA, "CN Application No. 201580037649.3 First Office Action dated Aug. 2, 2019", English and Chinese Translations, 19 pages.
EPO, "EP Application Serial No. 15792362.4 Communication Pursuant to Article 94(3) dated Sep. 24, 2018", 8 pages.
ISA, "PCT Application No. PCT/US19/39051 International Search Report and Written Opinion dated Sep. 13, 2019", 14 pages.
Taylor, Aaron M et al., "Unpublished U.S. Appl. No. 17/100,697, filed Oct. 20, 2020", 38 Pages.
Pavlini, Emily B et al., "Unpublished U.S. Appl. No. 17/133,764, filed Dec. 24, 2020", 93 Pages.
Musto, et al., "Semantics-aware Graph-based Recommender Systems Exploiting Linked Open Data", 2016, 9 pages.
"Greasemonkey", Wikipedia—http://en.wikipedia.org/wiki/greasemonkey Mar. 28, 2005, 5 Pages.
KBA, "TREC KBA 2014: Accelerate & Create", TREC Knowledge Base Acceleration; KBA a TREC evaulation 2014 , 1 Page.
KBA, "TREC KBA 2014: Streaming Slot Filling", TREC Knowledge Base Acceleration; KBA a TREC evaluation 2014 , 3 Pages.
"Office Assistant", Wikipedia—https://en.wikipedia.org/wiki/office_assistant May 11, 2015, 6 Pages.
Githubgist, "A Bluffers Guide to CRDTs in Riak", https://gist.github.com/russelldb/f92f44bdfb619e089a4d , 10 Pages Total.
Preguica, Nuno et al., "A commutative replicated data type for cooperative editing", A commutative replicateddata type for cooperative editing. 29th IEEE International Conference on Distributed Computing Systems (ICDCS 2009), Jun. 2009, Montreal, Qu'ebec, Canada. IEEE Computer Society, pp. 395-403, 2009, <10.1109/ICDCS.2009.20>. , 10 Pages Total.
Wikipedia, "Operational transformation", https://en.wikipedia.org/wiki/Operational_transformation#Basics , 10 Pages Total.
Sun, Chengzheng et al., "Operational Transformation in Real-Time Group Editors: Issues, Algorithms, and Achievements", Appeared in Proc. of 1998 ACM Conference on ComputerSupported Coopera-

(56) References Cited

OTHER PUBLICATIONS tive Work, Seattle, USA, Nov. 14-18, 1998, pp. 59-68. , 10 Pages Total.

* cited by examiner

KNOWLEDGE OPERATING SYSTEM

RELATED APPLICATIONS

This application is a continuation of U.S. application Ser. No. 16/001,884, filed Jun. 6, 2018, entitled "KNOWLEDGE OPERATING SYSTEM", the entire content of which is hereby incorporated by reference. U.S. application Ser. No. 16/001,884 claims priority to U.S. Prov. App. No. 62,516,052 filed on Jun. 6, 2017, the entire content of which is incorporated by reference.

U.S. application Ser. No. 16/001,884 is also related to Int'l Pat. App. No. PCT/US18/36345 filed on Jun. 6, 2018, and U.S. patent application Ser. No. 14/710,342 filed on May 12, 2015 (now U.S. Pat. No. 9,275,132), where the entire content of each is hereby incorporated by reference.

TECHNICAL FIELD

The present disclosure generally relates to computer-assisted creation, use, and sharing of knowledge structures.

BACKGROUND

Various tools have been developed to help gather and sort information. However, there remains a need for improved tools to discover and organize data in a manner that is persistent, portable, sharable, extensible, and that supports human and machine interaction.

SUMMARY

A journal of operations persistently stores a collection of user and machine interactions with documents, concepts within documents, and relationships/mentions among such documents and concepts. A knowledge graph or other visual expression can be used to provide an interactive format for user interactions with this information, and to visually display the accumulated information in the journal of operations on user's device of choice. Such accumulations are often called aggregations or aggregates. Both human users and computer users such as automated recommendation engines, machine learning algorithms, and the like can interact with the journal of operations to facilitate computer-assisted discovery and organization of data around a topic of interest to the human user. The resulting journal of operations and aggregations of those operations such as a knowledge graph or other visual expression(s) also provides a useful medium for sharing knowledge with other users and collaborating on investigation of a topic.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Furthermore, each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

Figure 1:
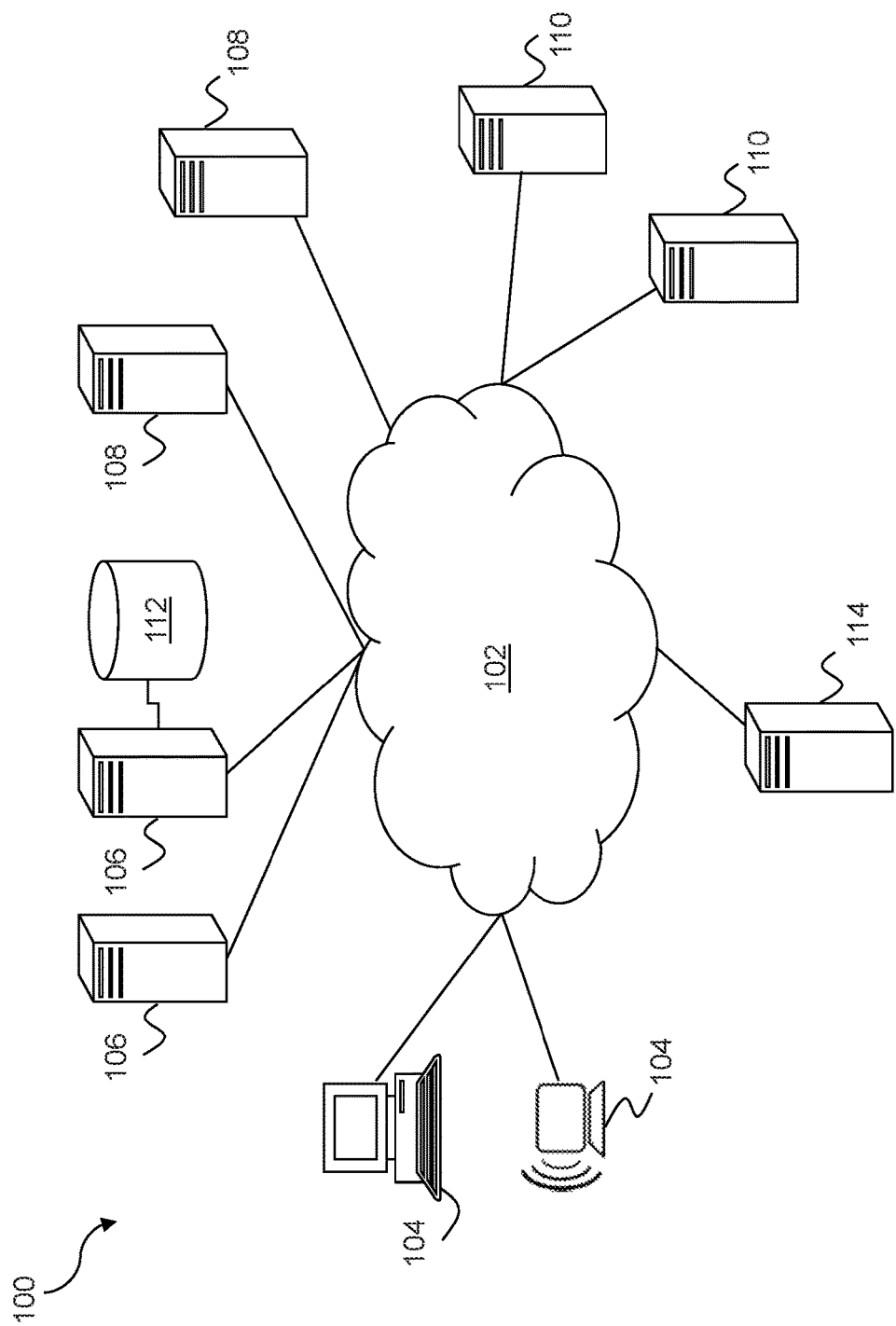
FIG. 1 shows a networked environment for entity-centric information retrieval and aggregation.

FIG. 1 shows a networked environment for entity-centric information retrieval and aggregation. In general, the environment 100 may include a data network 102 interconnecting a plurality of participating devices in a communicating relationship. The participating devices may, for example, include any number of client devices 104, servers 106, content sources 108, and other resources 110.

The data network 102 may be any network(s) or inter-network(s) suitable for communicating data and information among participants in the environment 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 100.

Each of the participants of the data network 102 may include a suitable network interface comprising, e.g., a network interface card, which term is used broadly herein to include any hardware (along with software, firmware, or the like to control operation of same) suitable for establishing and maintaining wired and/or wireless communications. The network interface card may include without limitation a wired Ethernet network interface card ("NIC"), a wireless 802.11 networking card, a wireless 802.11 USB device, or other hardware for wired or wireless local area networking. The network interface may also or instead include cellular network hardware, wide area wireless network hardware or any other hardware for centralized, ad hoc, peer-to-peer, or other radio communications that might be used to connect to a network and carry data. In another aspect, the network interface may include a serial or USB port to directly connect to a local computing device such as a desktop computer that, in turn, provides more general network connectivity to the data network 102.

The client devices 104 may include any devices within the environment 100 operated by users for practicing the entity-centric information retrieval and aggregation techniques as contemplated herein. Specifically, the client devices 104 may include any device for initiating and conducting searches, gathering information, drafting entity profiles, performing other research tasks, and so forth, as well as managing, monitoring, or otherwise interacting with tools, platforms, and devices included in the systems and methods contemplated herein. By way of example, the client devices 104 may include one or more desktop computers, laptop computers, network computers, tablets, mobile devices, portable digital assistants, messaging devices, cellular phones, smart phones, portable media or entertainment devices, or any other computing devices that can participate in the environment 100 as contemplated herein. As discussed above, the client devices 104 may include any form of mobile device, such as any wireless, battery-powered device, that might be used to interact with the networked environment 100. It will also be appreciated that one of the client devices 104 may coordinate related functions (e.g., searching, storing an entity profile, etc.) as they are performed by another entity such as one of the servers 106, content sources 108 or other resources 110.

Each client device 104 may generally provide a user interface, such as any of the user interfaces described herein. The user interface may be maintained by a locally executing application on one of the client devices 104 that receives data from, e.g., the servers 106 and content sources 108 concerning an entity. In other embodiments, the user interface may be remotely served and presented on one of the client devices 104, such as where a server 106 or one of the other resources 110 includes a web server that provides information through one or more web pages or the like that can be displayed within a web browser or similar client executing on one of the client devices 104. The user interface may in general create a suitable visual presentation for user interaction on a display device of one of the client devices 104, and provide for receiving any suitable form of user input including, e.g., input from a keyboard, mouse, touchpad, touch screen, hand gesture, or other use input device(s).

The servers 106 may include data storage, a network interface, and a processor and/or other processing circuitry. In the following description, where the functions or configuration of a server 106 are described, this is intended to include corresponding functions or configuration (e.g., by programming) of a processor of the server 106. In general, the servers 106 (or processors thereof) may perform a variety of processing tasks related to the entity-centric information retrieval and aggregation techniques discussed herein. For example, the servers 106 may manage information received from one or more of the client devices 104, and provide related supporting functions such as searching and the management of data. The servers 106 may also or instead include backend algorithms that react to actions performed by a user at one or more of the client devices 104. The backend algorithms may also or instead be located elsewhere in the environment 100.

The servers 106 may also include a web server or similar front end that facilitates web-based access by the client devices 104 to the capabilities of the server 106. A server 106 may also or instead communicate with the content sources 108 and other resources 110 in order to obtain information for providing to a user through a user interface on the client device 104. Where the user specifies search criteria such as search-type, language filters, relevance criteria (e.g., for determining relevance of a search result to an entity), confidence criteria (e.g., for determining whether a result relates to a particular entity), and the like, or search criteria is otherwise specified, e.g., through an action performed on an entity profile included on a client device 104, this information may be used by a server 106 (and any associated algorithms) to access other resources such as content sources 108 or other resources 110, to retrieve relevant or new information and re-rank search results. Additional processing may be usefully performed in this context such as recommending new search strategies to a user or recommending potentially new information to the user for addition to an entity profile.

A server 106 may also maintain a database 112 of content, along with an interface for users at the client devices 104 to perform searches and retrieval of database content using any of the techniques provided herein (e.g., automatically through an action performed on an entity profile). Thus, in one aspect, a server 106 (or any system including the server 106) may include a database 112 of entity information, and the server 106 may act as a server that provides a search engine for locating a particular attribute in the database 112, and providing supporting services such as retrieval of documents that are located.

In another aspect, the server 106 may support search activity by periodically searching for content at remote locations on the data network 102 and indexing any resulting content for subsequent search by a client 104. This may include storing location or address information for a particular document as well as parsing the document in any suitable manner to identify words, images, media, metadata and the like, as well as the creation of feature vectors or other derivative data to assist in similarity-type comparisons, dissimilarity comparisons, or other analysis. In one aspect, the database 112 may be manually curated according to any desired standards. The server 106 may provide or otherwise support an interface such as any of the interfaces described herein, which may be served to a user at a client 104.

A server 106 may also or instead be configured to track syndicated content or the like, such as by providing an interface for managing subscriptions to sources of content. This may include tools for searching existing subscriptions, locating or specifying new sources, subscribing to sources of content, and so forth. In one aspect, a server 106 may manage subscriptions and automatically direct new content from these subscriptions to a client device 104 according to input from a user. Thus, while it is contemplated that a client device 104 may autonomously subscribe to sources of content through a network interface and receive new content directly from such sources, it is also contemplated that this feature may be maintained through a remote resource such as a server 106.

The content sources 108 may include any sources of data or information in any structured, semistructured or unstructured format capable of being utilized by the techniques described herein, e.g., to update or refine an entity profile being created by a user. For example, the content sources 108 may include without limitation Web pages (e.g., public or private pages), search engines or search services, interfaces to various search services, application program interfaces (APIs) to remote sources of data, local or remote databases (e.g., private databases, corporate databases, government databases, institutional databases, educational databases, and so forth), libraries, other online resources, social networks, computer programs and applications, other entity profiles, and so forth. The content sources 108 may include various types of information and data including without limitation textual information (e.g., published or unpublished information such as books, journals, periodicals, magazines, newspapers, treatises, reports, legal documents, reporters, dictionaries, encyclopedias, blogs, wikis, and so forth), graphical information (e.g., charts, graphs, tables, and so forth), images or other visual data (e.g., photographs, drawings, paintings, plans, renderings, models, sketches, diagrams, computer-aided designs, and so forth), audio data, numerical data, geographic data, scientific data (e.g., chemical composition, scientific formulas, and so forth), mathematical data, and so forth.

The other resources 110 may include any resources that may be usefully employed in the devices, systems, and methods as described herein. For example, the other resources 110 may include without limitation other data networks, human actors (e.g., programmers, researchers, annotators, editors, and so forth), sensors (e.g., audio or visual sensors), text mining tools, web crawlers, knowledge base acceleration (KBA) tools or other content monitoring tools, and so forth. The other resources 110 may also or instead include any other software or hardware resources that may be usefully employed in the networked applications as contemplated herein. For example, the other resources 110 may include payment processing servers or platforms used to authorize payment for content subscriptions, content purchases, or otherwise. As another example, the other resources 110 may include social networking platforms that may be used, e.g., to share an entity profile or other research conducted by a user, or as additional sources of entity information. In another aspect, the other resources 110 may include certificate servers or other security resources for third party verification of identity, encryption or decryption of content, and so forth. In another aspect, the other resources 110 may include a desktop computer or the like co-located (e.g., on the same local area network with, or directly coupled to through a serial or USB cable) with one of the client devices 104. In this case, the other resource 110 may provide supplemental functions for the client device 104. Other resources 110 also include supplemental resources such as scanners, cameras, printers, and so forth.

The environment 100 may include one or more web servers 114 that provide web-based access to and from any of the other participants in the environment 100. While depicted as a separate network entity, it will be readily appreciated that a web server 114 may be logically or physically associated with one of the other devices described herein, and may, for example, include or provide a user interface for web access to one of the servers 106 (or databases 112 coupled thereto), one of the content sources 108, or any of the other resources 110 in a manner that permits user interaction through the data network 102, e.g., from a client device 104.

It will be understood that the participants in the environment 100 may include any hardware or software to perform various functions as described herein. For example, one or more of the client device 104 and the server 106 may include a memory and a processor.

The various components of the networked environment 100 described above may be arranged and configured to support the techniques described herein in a variety of ways. For example, in one aspect, a client device 104 connects through the data network 102 to a server 106 that performs a variety of processing tasks related to entity-centric information retrieval and aggregation. For example, the server 106 may host a website that runs an entity-centric information retrieval and aggregation program where a user builds an entity profile that is used as a query for searching, retrieving, and ranking information related to the entity. In this manner, as a user builds the entity profile on an interface displayed on the client device 104, the server 106 may update a search for new and pertinent information related to the entity profile using the content sources 108, other resources 110, or database 112. As discussed in more detail below, the server 106 (or another participant in the environment 100) may include one or more algorithms that define the search and allow the server 106 to react to actions taken on the entity-centric information retrieval and aggregation program, such as revisions made to the entity profile or the selection of information.

Figure 2:
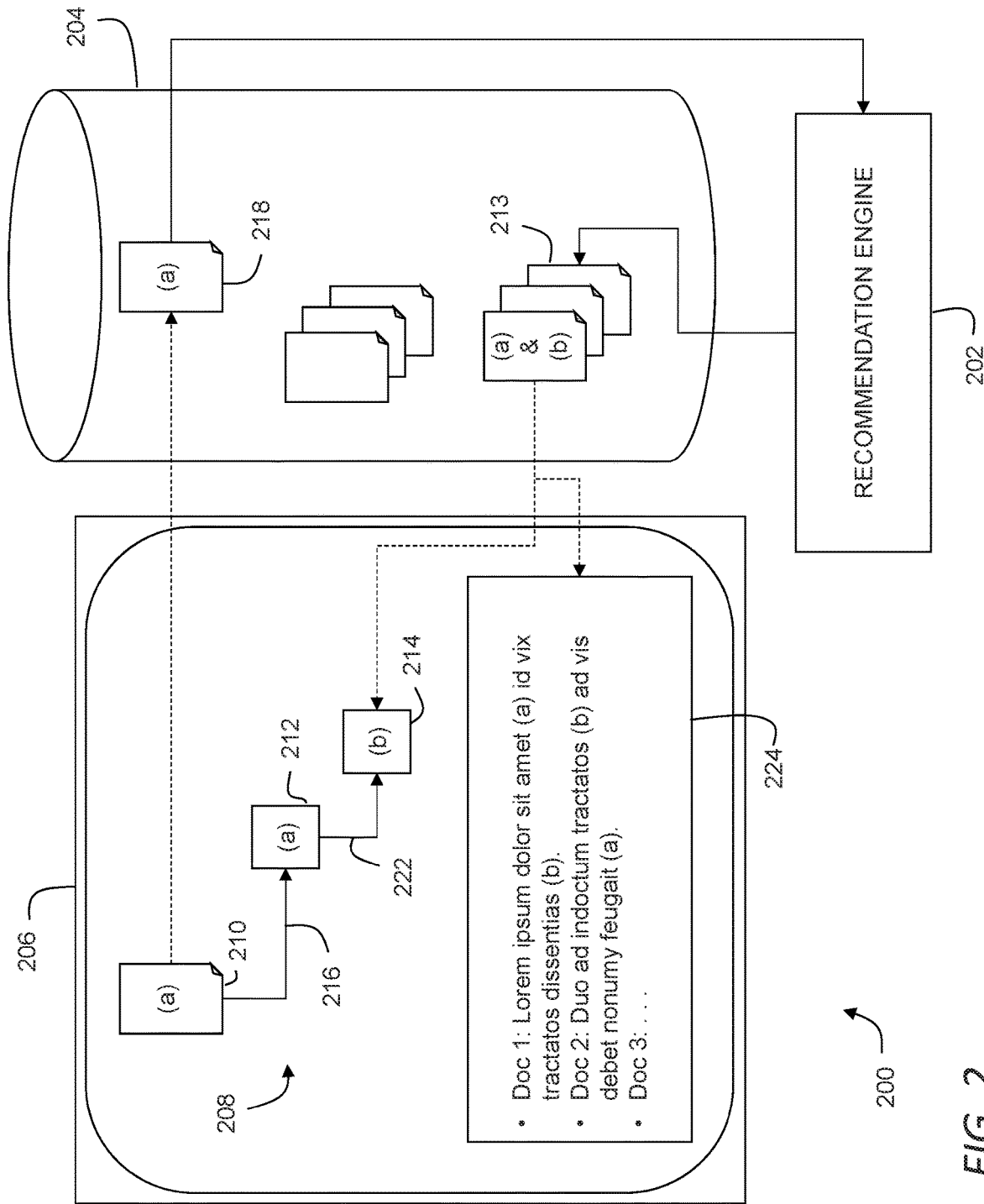
FIG. 2 shows a system for recommending content.

FIG. 2 shows a system for recommending content. In particular, a recommendation engine 202 may provide recommendations concerning, e.g., related documents and concepts from a corpus of documents 204, to a human user in a user interface 206 based on user interactions.

The user interface 206 may, for example, include any display, interface device, interface component, or the like suitable for displaying content such as a knowledge graph 208 to a human user and receiving input such as graphical interface input, text input, and so forth from the human user. This may, for example, include a display for any of the client devices described above. In general, the knowledge graph 208 may include one or more documents represented in the user interface 206 by document icons, along with one or more concepts represented in the user interface 206 by concept icons. To form the knowledge graph 208, these documents and concepts may be associated through relationships such as graph edges that are represented as visual indicators of mentions within the user interface 206. As depicted, the user interface 206 rendered in a display may include a document icon 210, a first concept icon 212, and a first visual indicator 216. The document icon 210 may, for example, be associated with a first document 218 in the corpus of documents 204, which may be stored, for example, in a single database or data store, or distributed across a data network or other distributed environment and indexed as appropriate for identification through a search engine or the like. It will be appreciated that, while depicted separately from the user interface 206, the first document 218 and one or more other documents in the corpus of documents 204 may be located on a device that hosts and controls the user interface 206. The documents may also or instead be remote from the device, or some combination of these.

It should be appreciated that, while the knowledge graph 208 is referred to herein as a suitable manner of visually presenting information, any other visual expression of the corresponding data may also or instead be used. For example, as described herein, user and machine interactions with a visual expression such as the knowledge graph 208 are recorded in a journal of operations that serves as a data repository for related activity. While the records in the journal of operations may be aggregated to create a knowledge graph 208 for presentation to a user, the records may also or instead be aggregated to create any other suitable visual expression of a project represented by the journal of operations. Thus, for example, where the text refers to a knowledge graph 208 as a matter of convenience, it should be understood that the text is also intended to refer to other visual expressions such as the summary cards and mention highlights described below, as well as any other visual expressions suitable for presenting an organization of information to a user and/or receiving user input related to such information.

In general, the first concept may be mentioned in the first document 218, as represented by the first visual indicator 216 associating the first concept icon 212 with the document icon 210 in the user interface 206. The user interface 206 may be configured to automatically, or in response to a user request, identify other documents in the corpus of documents 204 that also mention the first concept, designated generally as (a) in FIG. 2. The recommendation engine 202 may either automatically or in response to an explicit user request, identify documents 213 in the corpus of documents that identify the first concept, (a) and a second concept, (b), and then to recommend the second concept, (b) for inclusion in the knowledge graph 208. In general, the recommendation engine 202 may automatically create a second concept icon 214 identifying the second concept, along with a second visual indicator 222 to visually associate the first concept icon 212 with the second concept icon 214 in the user interface 206. The recommendation engine 202 may also or instead identify the candidate relationship and communicate the relationship to an agent executing locally on the device hosting the user interface 206, and the agent can determine how best to configure and display the visual indicator and/or icon. It will also be understood that the recommendation engine 202 may automatically populate the knowledge graph 208 within the user interface 206, or a candidate document, concept, or relationship may be presented to a user through the user interface 206 so that the user can accept, reject, modify, or request clarification of the proposed addition.

The recommendation engine 202 may also provide a variety of supporting information for any proposed additions. For example, the recommendation engine 202 may create a ranked list 224 of the plurality of other documents 213 (that contain mentions of (a) and (b)) and transmit the ranked list 224 to the device for presentation in the display, e.g., in the user interface 206. This may include snippets, content excerpts, or the like, e.g., that substantiate the relationship between (a) and (b), or the mention either of both of the corresponding concepts within the document(s). A variety of ranking techniques may be used to select and order the documents in the ranked list 224, as discussed for example, below.

Figure 3:
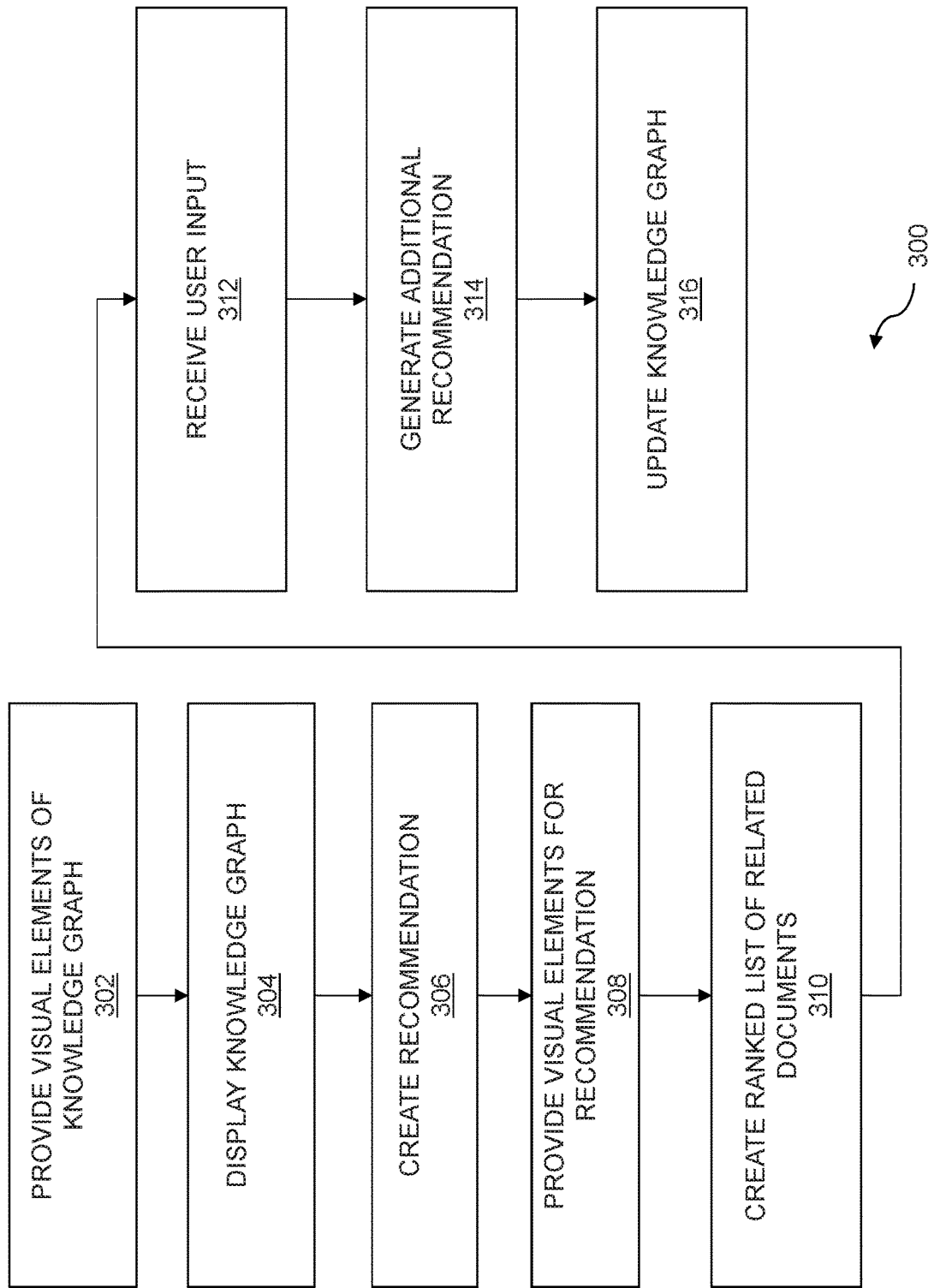
FIG. 3 shows a flow chart of a method for recommending content.

FIG. 3 shows flow chart of a method for recommending content. In general, a user may interact with a knowledge graph displayed in a user interface, and a recommendation engine may responsively generate recommendations for additions to the knowledge graph based on the specific user request and other contextual information. This process may continue iteratively to support the creation of a knowledge graph through a sequence of user initiated, computer assisted recommendations and selections as described, for example, below.

As shown in step 302, the method 300 may begin with providing a document icon, a first concept icon, and a first visual indicator for presentation in a display. The document icon may, for example, be associated with a first document in a corpus of documents such as a local document repository, a remote document repository, a collection of documents indexed by a search engine, or some combination of these. The first concept icon may be associated with a first concept mentioned in the first document and also mentioned in a plurality of other documents in the corpus of documents. As further described herein, the visual indicator may visually associate the document icon with the first concept icon in the display. These display elements may be provided by a remote source, generated locally in response to a remotely stored model for a knowledge graph, generated locally to display aspects of a journal of operations (as described herein), or otherwise provided or created to visually present a knowledge graph within a user interface in a display. As noted above, while a knowledge graph is one convenient technique for presenting information from a journal of operations, any other visual expression of the journal of operations suitable for conveying the organization of information and/or receiving user input related to same may also or instead be used.

As shown in step 304, the method 300 may include displaying a knowledge graph, e.g., that visually shows and associates documents, concepts, and mentions therebetween, all as generally contemplated herein. In general, the knowledge graph may be an interactive object within the user interface, and may support user interaction with individual vertices (e.g., documents or concepts) and edges (e.g., mentions among documents/concepts) such as by facilitating retrieval and display of additional, supporting information or requests for additional recommendations or the like. The knowledge graph may be displayed with any other useful contextual information. For example, the method 300 may include presenting excerpts from the plurality of other documents for presentation in the display that substantiate a relationship of a first concept in the knowledge graph to the second concept in the knowledge graph.

As shown in step 306, the method 300 may include creating a recommendation for a second concept, such as a second concept different than the first concept mentioned in the plurality of other documents from the corpus of documents that mention the first concept. This may include creating a recommendation with a recommendation engine or the like. In one aspect, the recommendation may be created in response to an explicit user request for a recommendation, such as an interaction with the knowledge graph in the user interface. In another aspect, recommendations may be automatically generated, e.g., in response to navigation through the knowledge graph or other user context, user activities or the like.

As shown in step 308, the method 300 may include providing visual elements for a recommendation. For example, this may include generating a second concept icon identifying the second concept and a second visual indicator to visually associate the first concept icon with the second concept icon in the display, along with providing the second concept icon and the second visual indicator for presentation in the display. As noted above, this may be performed locally at a client hosting a user interface, or remotely, e.g., by a recommendation engine that provides recommendations for the knowledge graph or by a server or other cloud service or the like that hosts a knowledge graph presentation platform. In one aspect, the first visual indicator may have a visually distinguishable appearance from the second visual indicator, e.g., so that a user can distinguish between user-selected and machine-selected relationships, so that a user can distinguish order of creation of relationships, or in order to provide any other information useful for distinguishing among different sources of and types of relationships contained within a knowledge graph.

As shown in step 310, the method 300 may include creating a ranked list of the plurality of other documents that mention the first concept for presentation in the display. The documents may be advantageously ranked, e.g., based on a context for the knowledge graph such as a history of user selections, machine-generated recommendations, and the like leading to the current graph. The list may also or instead be ranked for a variety of potential uses such as based on how well the documents support a relationship between two concept icons or whether each document contains new information that might be useful for addition to the knowledge graph. By way of non-limiting example, the ranked list may include a ranking according to at least one of similarity to the first concept, difference from the first document, or strength of substantiation of the second concept to the first concept. Creating the ranked list may also include presenting the ranked list for presentation in the display, e.g., with a local program/resource or from a remote resource, in response to a user selection of the second visual indicator.

As shown in step 312, the method 300 may include receiving a user input. This may include a keyboard entry, mouse operation, or other user input or the like indicating an action desired by the user within the context of the knowledge graph and associated information.

As shown in step 314, the method 300 may include generating an additional recommendation. For example, where the user input includes a user selection of a second document, generating the additional recommendation in response to the user selection may include providing a second document icon, a third concept icon, and a third visual indicator for presentation in the display, the second document icon associated with the second document, the third concept icon associated with a concept in the second document, and the third visual indicator to visually associate the second document icon with the third concept icon in the display. This may facilitate presentation of the additional recommendation in the display. It will be noted that while the additional recommendation may be generated in response to an explicit user input, additional recommendations may also or instead be generated in the absence of user input, e.g., as a background task based on a status of the knowledge graph, or in response to a user action suggesting the user will request additional recommendations, or that the user may be interested in additional recommendations that are already available.

In one aspect, the additional recommendation may include a recommendation for a third concept, e.g., in response to a user selection in the user interface of the first concept icon and/or the second concept icon. Further, the process may be iterative and may include identifying relationships among elements of the knowledge graph in addition to new documents or concepts of potential interest. Thus, for example, the additional recommendation may include, in response to receiving the user selection of the second document, creating a fourth visual indicator to visually associate at least one of the first concept icon and the second concept icon with the third concept icon in the display A recommendation engine for generating such recommendations may execute locally on a client that renders the display. The recommendation engine may also or instead execute remotely from a client that renders the display. In general, the recommendation engine may be supported by any of a variety of databases and other data sources, indexes of content, processing resources, services, and so forth. Thus, although not illustrated in FIG. 3, it will be appreciated that the method 300 may include storing the corpus of documents in one or more locations accessible to the recommendation engine. In another aspect, the method 300 may include storing an index for the corpus of documents, the index identifying at least one concept for each document in the corpus of documents.

As shown in step 316, the method 300 may include updating the knowledge graph or other visual expression of the journal of operations. This may, for example, include updating a data structure that contains information about the knowledge graph (e.g., relationships among documents and concepts, along with substantiating information for such relationships). This may also or instead include updating a data structure such as a journal of operations that includes a historical record of user interactions and machine interactions with the knowledge graph and/or elements of the knowledge graph. For example, the method 300 may include storing a journal of operations including one or more user interactions with at least one of the document icon, the first concept icon, and the second concept icon and at least one recommendation from the recommendation engine. Storing the journal of operations may include storing the journal of operations in a persistent memory independent of a device hosting the display. Storing the journal of operations may also or instead include storing the journal of operations in a persistent memory independent of a device hosting the recommendation engine.

Updating the knowledge graph may also or instead include updating a display of the knowledge graph, which may include locally updating a display on a device, or remotely updating a display from a remote resource. In one aspect, the display may be associated with a remote client with a user interface controlled by a server or other remote resource, and providing the document icon, the first concept icon, and the first visual indicator may include transmitting the document icon, the first concept icon, and the first visual indicator to the remote client for presentation in a user interface of the remote client.

It will be appreciated that some or all of the steps of the method 300 may be repeated iteratively to develop a knowledge graph. For example, additional inputs may be received as in step 312, and additional recommendations may be generated and used to further update the knowledge graph.

According to the foregoing, there is also disclosed herein a system for recommending content. The system may include a device including a display, a processor of the device, and a recommendation engine coupled in a communicating relationship with the device. The processor may be configured to provide a document icon, a first concept icon, and a first visual indicator for presentation in the display, where the document icon is associated with a first document, where the first concept icon is associated with a first concept mentioned in the first document and also mentioned in a plurality of other documents, and where the first visual indicator visually associates the document icon with the first concept icon in the display. The recommendation engine, which may be remote from or local to the device, or some combination of these, may be configured to receive a request from the device for concepts related to the first concept, and to create a recommendation for a second concept mentioned in a plurality of other documents, the second concept different than and related to the first concept, the recommendation engine further configured to communicate the recommendation to the device, including excerpts from the plurality of other documents substantiating a relationship between the first concept and the second concept.

Figure 4:
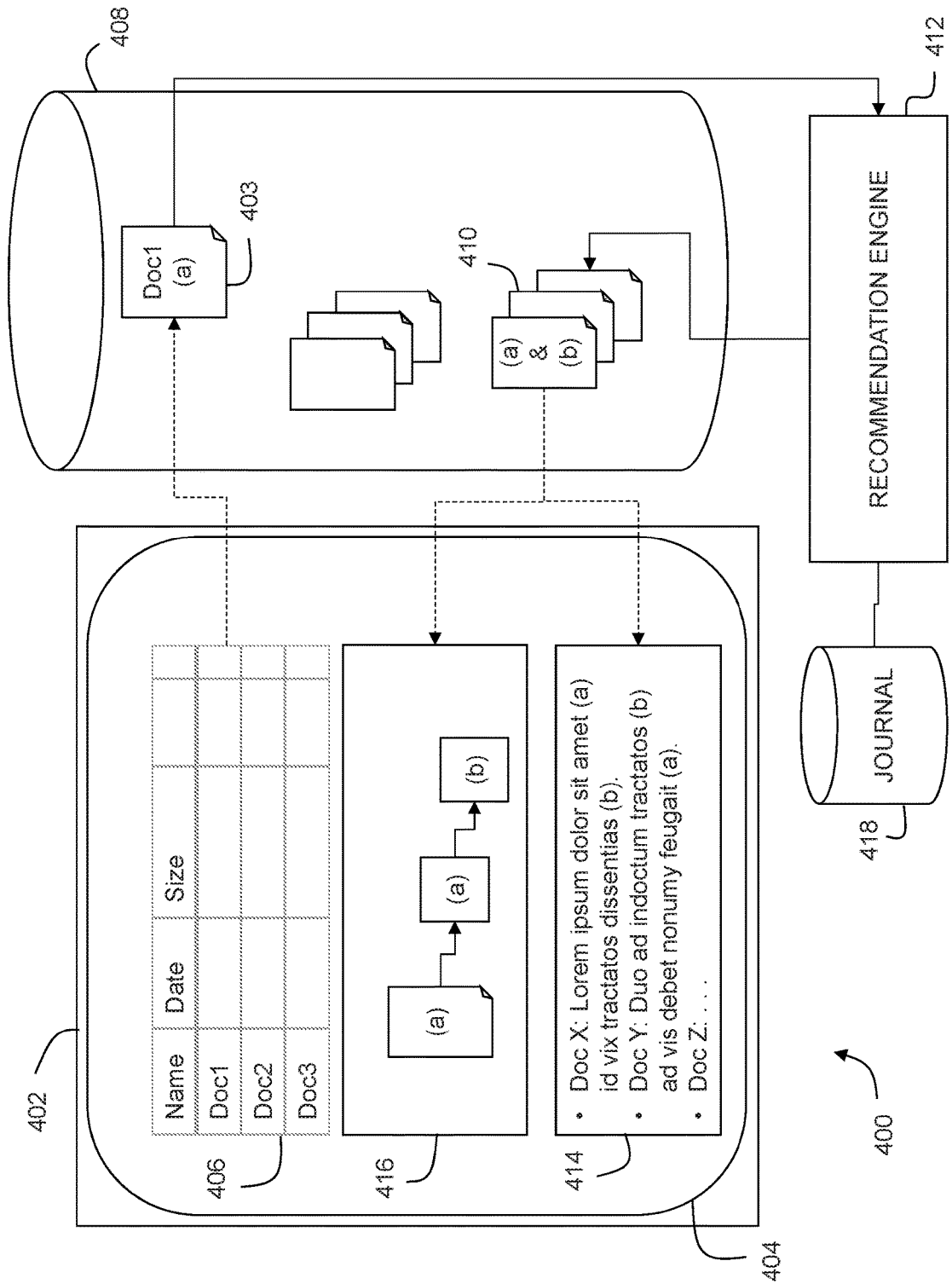
FIG. 4 shows a system for recommending content.

FIG. 4 shows a system for recommending content. In general, the system 400 is configured to presents human-readable substantiation of automated content recommendations such as those described herein.

The system 400 may include a display 402 with a user interface 404 that displays a representation of a number of documents 406, such as a file listing, a group of icons, or any other suitable representation of files in a corpus of documents 408. In response to a selection of a document 403 in the user interface 404, the system 400 may initiate a search by a recommendation of one or more other documents 410 from the corpus of documents 408 with a recommendation engine 412 as generally described herein. In particular, the recommendation engine 412 may search for documents that mention a first concept (a) in the selected document 403, and the mention a second concept (b) that is potentially related to the first concept (a). As further described herein, the recommendation engine 412 may return graphical representations of any documents and concepts, along with relationships therebetween. The recommendation engine 412 may also return information, such as snippets or excerpts from the documents 410 that substantiate a relationship to the selected document 403, which may be presented in a list 414 or the like, such as a ranked list.

The list 414 may further contain interactive content such as links to the supporting documents 410, links to locations of concepts within the knowledge graph 416, and so forth.

The recommendation engine 412, or some other suitable service or entity within the system 400 may also maintain a journal of operations 418 as described herein, which generally stores a record of human user interactions and machine user interactions with the knowledge graph 416, which may be shared, edited, used as context for further recommendations, and so forth. It will also be appreciated that the system 400 may be configured to support iterative creation of the knowledge graph 416. For example, the list 414 may serve as the representation of documents 406, so that as each new list of recommendations is created, this may be used by a user to search for additional concepts and recommendations.

Thus, the knowledge graph 416 may be generally extensible, and may further be shared with other users, e.g., as a journal of operations 418 to provide a platform for collaborative knowledge discovery.

Figure 5:
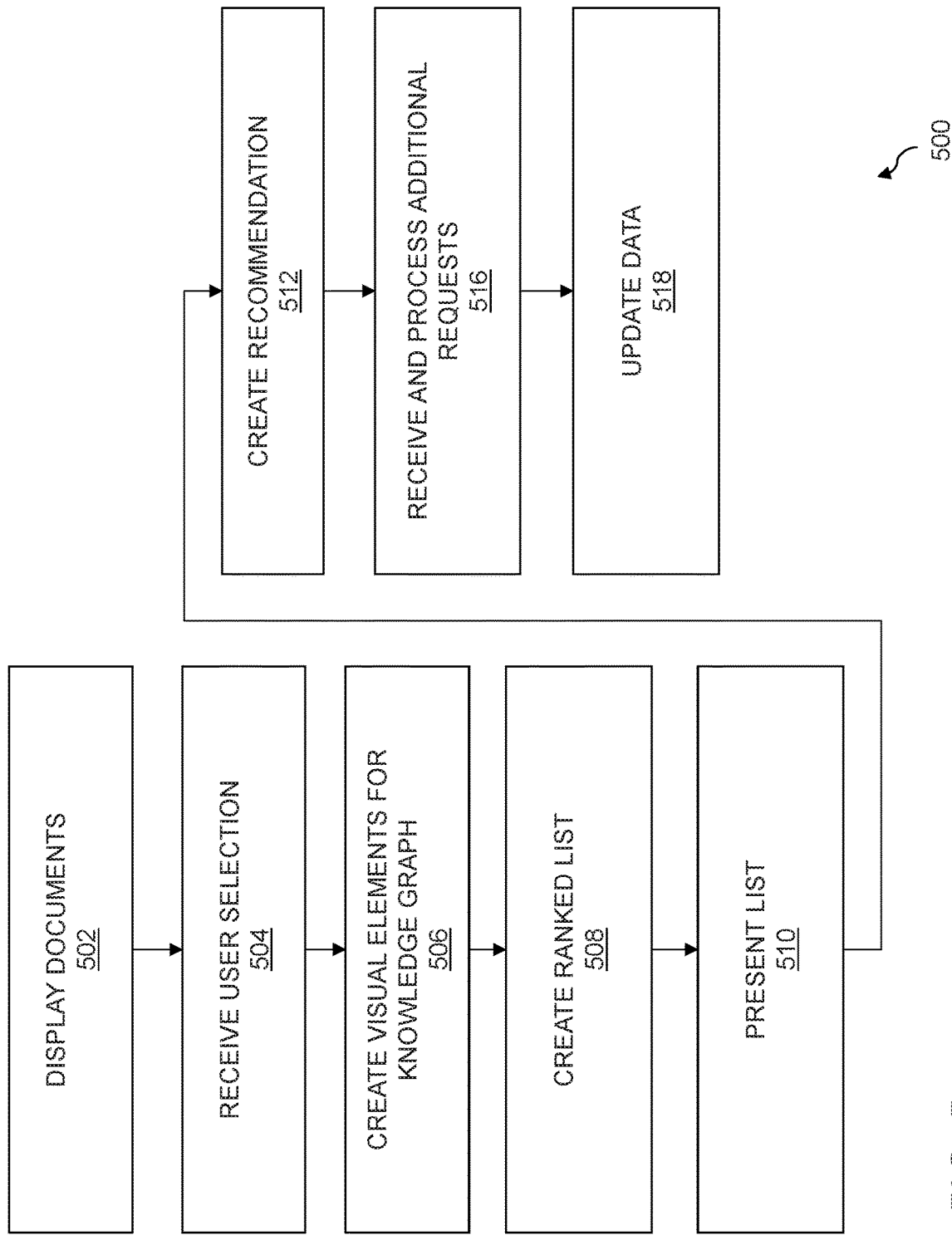
FIG. 5 shows a flow chart of a method for recommending content.

FIG. 5 shows a flow chart of a method for recommending content.

As shown in step 502, the method 500 may begin with displaying documents, such as by displaying a representation of a first plurality of documents from a corpus of documents in a user interface of a device as described above. This may include a file listing, a window with icons for documents, or any other suitable representation of documents for display and manipulation within a user interface.

As shown in step 504, the method 500 may include receiving a user selection, such as by receiving a user selection in the user interface of a first concept in a first document from the first plurality of documents. This may include a keyboard operation, a mouse click, or any other suitable user interface interaction.

As shown in step 506, the method 500 may include automatically performing a number of steps to create visual elements for a knowledge graph. For example, this may include selecting a first concept icon associated with the first concept mentioned in the first document and presenting the first concept icon for display in the user interface. This may also include presenting a first visual indicator in the user interface that visually connects a document icon for the first document with the first concept icon. This may also include (e.g., automatically in response to the user selection) creating a recommendation of a second concept different than the first concept with a recommendation engine remote from the device. The second concept may, for example, be a concept mentioned in a second plurality of documents from the corpus of documents that all include a mention to both the first concept (selected by the user) and the second concept. This may also include (also optionally automatically in response to the user selection) presenting a second concept icon associated with the second concept for display in the user interface, and presenting a second visual indicator in the user interface, the second visual indicator visually connecting the first concept icon with the second concept icon.

As shown in step 508, the method 500 may include creating a ranked list of one or more content selections from the second plurality of documents containing mentions of the first concept and the second concept. The list may contain, e.g., document titles, filenames, creation dates, and the like, as well as snippets of information related to the concepts to facilitate human review. The ranked list may be ranked in any suitable manner useful for editing, updating, verifying, or otherwise reviewing or modifying the knowledge graph. For example, the ranked list may be ranked according to graph distance between two related concepts. The ranked list may be ranked according to an estimate of substantiation of a relationship between the first concept and the second concept, which may, e.g., be evaluated using machine learning, artificial intelligence, semantic processing, or any other tools for automated evaluation and comparison of document contents. The ranked list may also or instead be ranked according to distance within each of the second plurality of documents between the mention of the first concept and the second concept, which may serve as a proxy for the relationship of the two concepts within the document. The ranked list may also or instead be ranked according to a number of mentions of the first concept and the second concept, or any other suitable metric or combination of metrics for evaluating or estimating the relationship between the concepts or the relevance to the knowledge graph.

As shown in step 510, the method 500 may include presenting at least a portion of the ranked list for display in the user interface. In this manner, a group of documents related through a secondary concept to one another and the first concept selected by the user may automatically be generated and presented as a list in the user interface for further user interaction. The ranked list of one or more content selections may, for example, include content supporting a relationship between the first concept icon and the second concept icon.

As shown in step 512, the method 500 may include creating a recommendation for the user. For example, after the ranked list is presented, a user request for additional related concept recommendations may be received. In response to such a user request, the method 500 may include adding one or more additional concept icons associated with concepts mentioned in documents from the corpus of documents to the user interface and for each additional concept icon, adding at least one visual indicator visually associating the additional concept icon with one or more other ones of the concept icons displayed in the user interface.

As shown in step 514, the method 500 may include receiving and processing any number of additional user requests to iteratively explore, expand, and refine the knowledge graph. For example, the method 500 may include receiving a second user request for content substantiating a relationship between two of the concept icons. In response to this second request, the method may include presenting one or more content items from within documents from the corpus of documents that describe a connection between the two of the concept icons.

This may also or instead include updating the display in the user interface, such as by updating the presentation of documents, the knowledge graph, the ranked list of documents, and any other portions of the user interface. This may also or instead include updating a journal of operations that stores human and machine interactions with the knowledge graph.

Figure 6:
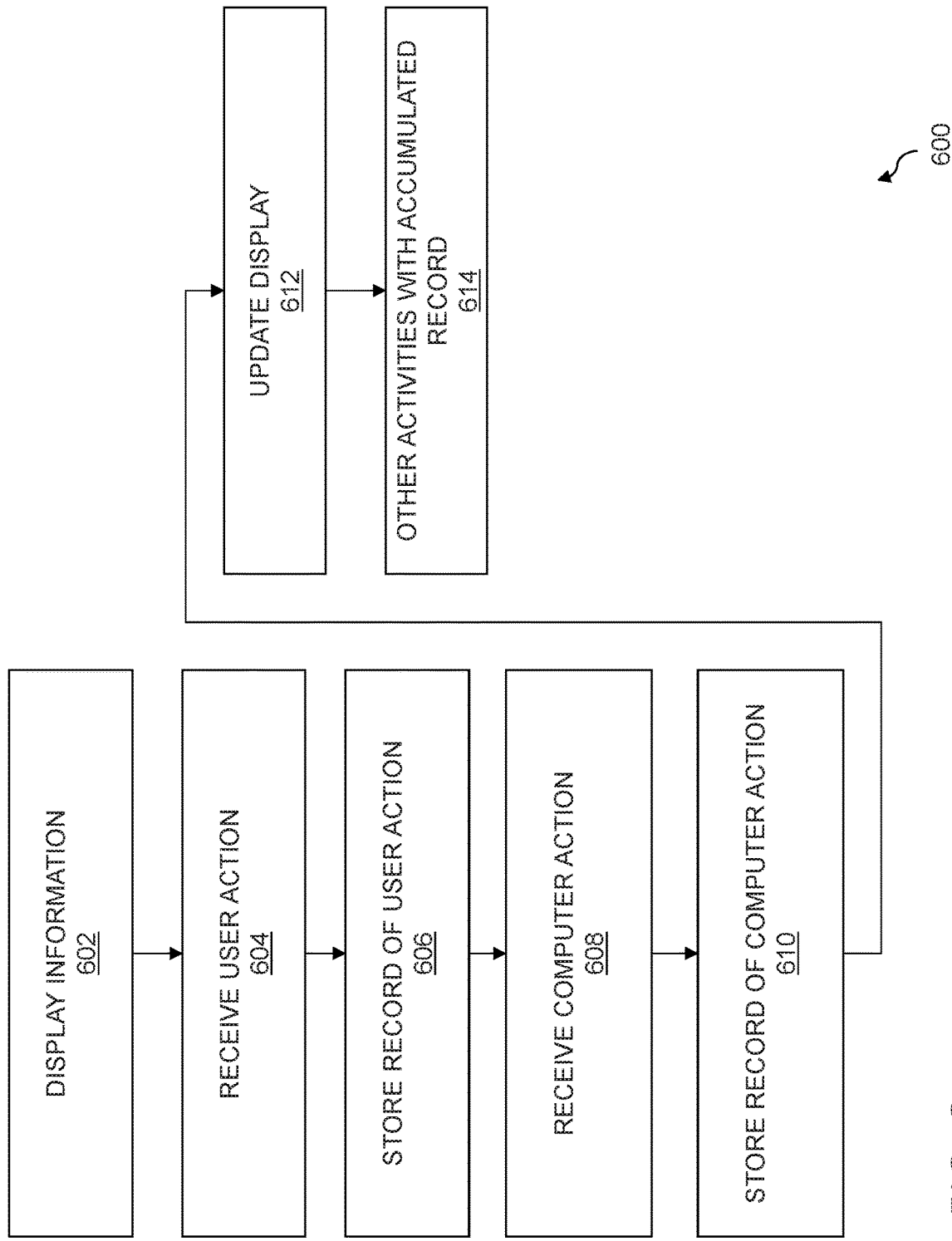
FIG. 6 shows a flow chart of a method for journaling activity in a computer-assisted knowledge discovery process.
Figure 7:
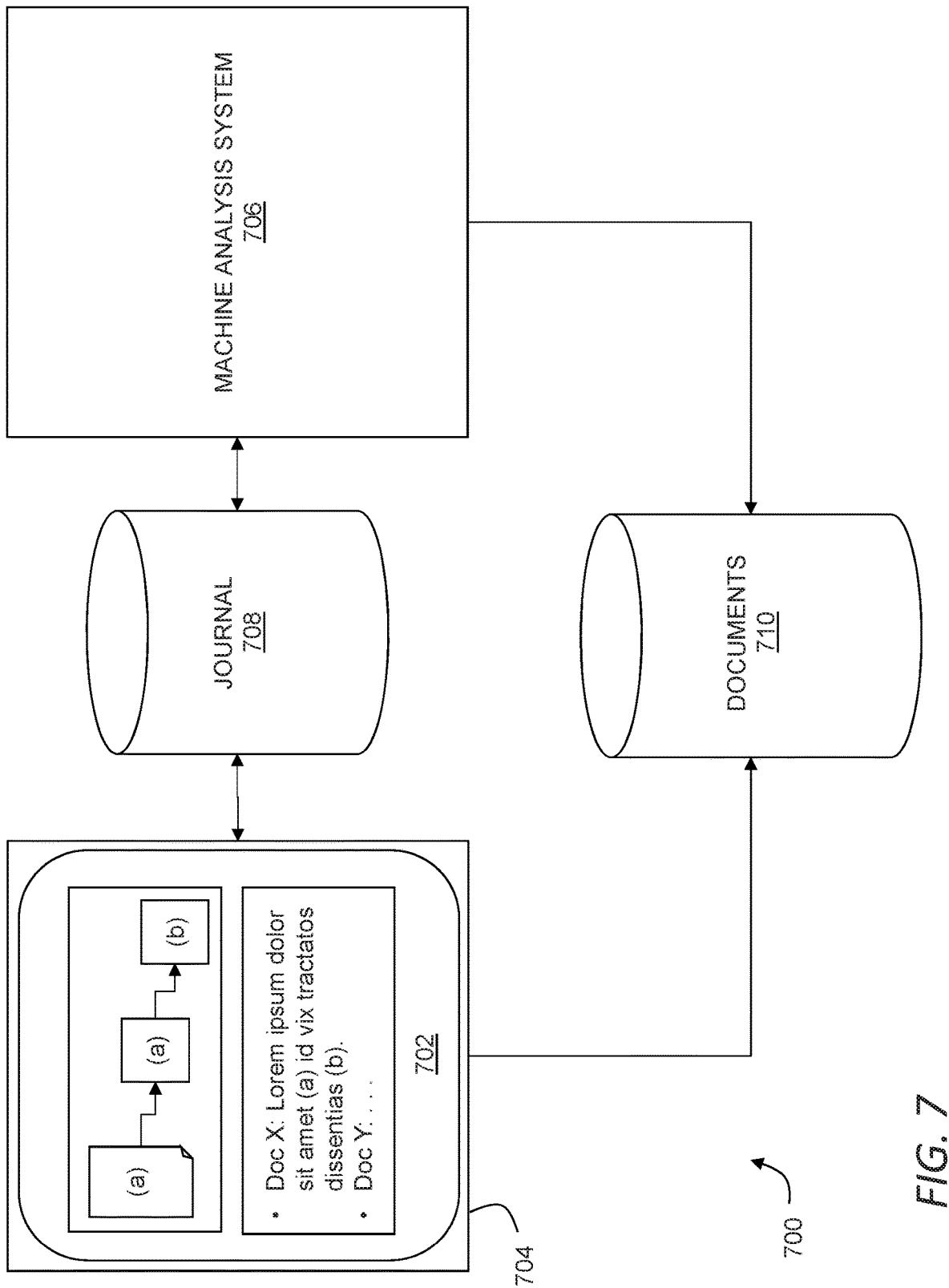
FIG. 7 shows a system for computer-assisted research and knowledge discovery.

FIG. 6 illustrates a method for journaling activity in a computer-assisted knowledge discovery process.

As shown in step 602, the method 600 may include displaying information. In general, this may include any structured representation of knowledge, information, data sources, relationships, and so forth. This may, for example, include a knowledge graph as described herein, or any other knowledge representation or the like suitable for presentation in a user interface of a device. Thus, in one aspect, this may include presenting a graph in a visual display element on a first surface. This may include, e.g., a display of a computer, tablet, smartphone, or the like, as well as a window or other active graphical portion of an application, process or the like within such a physical display medium. For a knowledge graph or the like, the graph may include a plurality of graph elements including one or more documents and concepts presented as vertices of the graph, and one or more relationships among the one or more documents and concepts presented as edges of the graph.

As shown in step 604, the method may include receiving a user action. This may, for example, include receiving a user input from a human user with one of the plurality of graph elements in the visual display element, or any other input from a human user with the user interface or device rendering the knowledge graph or other knowledge representation. In one aspect, this may include a request for recommendations, a request for substantiation of a relationship in a knowledge graph, a request for a document identified by a document icon in the knowledge graph, or any other information related to or based upon the content of the knowledge graph. In another aspect, the user action may be a manipulation of the knowledge graph. For example, the first action may include adding the first document as a vertex to the graph, removing a vertex from the graph, removing an edge from the graph, or adding an edge to the graph.

In one aspect, where a user interface displays a mention of a concept, e.g., as a concept icon or as text within a document, the first action by the user may include a user interaction with the first mention, such as a selection of the first mention, a request for related documents, a request for related concepts, and so forth.

As shown in step 606, the method 600 may include storing a record of the first action. The record may usefully include any information about the state of the knowledge graph, the nature of the user interaction, or other information useful for identifying or interpreting the action or the context in which the action was taken. In one aspect, the record may include a relationship of the first document to one or more other documents, e.g., other documents within the display or within a search or recommendation provided for the user. In another aspect, the record may include a relationship of the first mention to one or more other mentions in one or more other documents. More generally, the record may include any information about the knowledge graph or other knowledge representation, the manner in which the user interacted with the user interface, the specific or general nature of any request or instruction provided by the user, and so forth. In one aspect, the record may include identifying information for a first document associated with the first action and a first mention of a first concept within the first document associated with the first action.

Storing the record may also or instead include storing a record of the first action in a journal of operations. As describe herein, the journal of operations may be persistently stored in a data store accessible by the first surface and also accessible by a machine-based algorithm operating on a computing platform executing independently from a device hosting the first surface such as a machine-based algorithm for generating recommendations and so forth.

As shown in step 608, the method 600 may include receiving a computer action, such as a second action from a machine-based algorithm that responds to the first action from the user. The second action may be any suitable response to the user action. For example, the second action may identify a second mention of a concept selected by the user in a second document. In another aspect, this may include any recommendation that might be provided by a recommendation engine or the like as contemplated herein, including relevant or potentially relevant documents or concepts identified by a machine-learning algorithm, neural network, or other pattern matching algorithm or the like. In another aspect, this may include data processing or manipulation. For example, the computer action may include an automated selection of one or more excerpts from the second document that substantiate a relationship between a first mention of a first concept and a second mention of a second concept, either within the knowledge graph, within a list of possible recommendations for addition to the knowledge graph, or some combination of these. This may also or instead include recommended changes to a knowledge graph, such as the addition of a vertex, an edge, or the like. For example, the machine-based algorithm may identify a relationship between two concepts already within a knowledge graph, or a new concept related to the knowledge graph, and the second action may include adding an edge to the graph indicative of that relationship.

As shown in step 610, the method 600 may include storing a record of the computer action. This may, for example, include storing the second action (or a description of the second action) in a journal of operations or other suitable repository. This may also include recording any contextual information or the like suitable for subsequent use of the record.

As shown in step 612, the method 600 may include updating a display, e.g., of the knowledge graph or other knowledge representation in the user interface, or related items such as ranked lists of documents, recommendations, and so forth. In one aspect, this may include presenting a second document recommended in step 608 in a visual display element on a first surface.

As shown in step 614, the method 600 may include other activities that can be performed based on the accumulated record in the journal of operations or other similar accumulation of records of human and machine operations on a knowledge graph or the like. As noted above, the journal of operations may be stored in a network accessible location, which permits, e.g., sharing and collaboration among multiple users. A current version of the knowledge graph may be derived from the journal of operations and displayed as desired on any number of devices. More generally, the journal of operations may be applied in any suitable manner to display, share, edit, or otherwise manipulate a knowledge graph or other visual expression of the journal of operations.

For example, this may include applying the journal of operations to display the graph on a second surface. In one aspect, this permits a user to port a particular research project contained within a knowledge graph to a second surface such as another device used by the user. In another aspect, this permits the user to share the knowledge graph with other users by applying the journal of operations to display the graph on a second surface for another user.

In another aspect, this may include facilitating sharing of the journal of operations with one or more other users so that these other users can view, modify, copy, or otherwise interact with the graph. This may, for example, include sharing the data structure of the journal of operations with one or more other users through a data network, or publishing an interactive knowledge graph based on the journal of operations for use by others.

In another aspect, a single user may have multiple research projects, each represented by a separate journal of operations. Thus, the method 600 may include storing a number of journals of operations, some of which may be associated with different projects to which the human user has write permissions. In order to ensure that user actions are correctly distributed among such journals, the user interface may employ any of a variety of mechanisms to manage where particular user actions are recorded. For example, in one aspect, a user interface may request an explicit selection of a particular project or journal of operation, and this project may be used to capture all user interactions, e.g., across different devices, documents, applications, and the like until the user specifies a different project or journal of operations. In another aspect, the system may infer a change based upon a change of application, a change of device or the like. Thus, the method 600 may include monitoring activity of the human user on one or more surfaces and automatically selecting one of the plurality of journals of operations to record a current activity, or requesting a user selection of one of the plurality of journals of operation under various conditions or in response to various events. In another aspect, the system may record an operation in multiple journals. For example, a user may have a long-running history journal where they allow all of their operations to be recorded and multiple other journals for certain explorations or tasks that also receive a subset of the user's operations.

In another aspect, the journal of operations may also be used for other types of processing. For example, the method 600 may include ranking a list of documents that mention the concept and a second concept based on an aggregation of data in the journal of operations. This includes data explicitly specifying, e.g., structure of the knowledge graph or document contents. This may also or instead include data implying relationships. For example, context for user actions may imply relevance, such as the context in which a request for recommendations is made. In another aspect, order of user actions may imply relevance, such as the order in which a user added concepts to a knowledge graph or requested substantiation of edges of the graph. In another aspect, the frequency of user actions may imply relevance, such as the frequency with which a user requests substantiation of a particular edge of the graph or the frequency with which a user requests concepts related to a particular concept represented by a vertex in a graph.

According to the foregoing, there is also disclosed herein a system for journaling activity in a computer-assisted knowledge discovery process. In general, the system may include a data store, a journal of operations stored on the data store, and a device having a display and a processor.

The data store may, for example, be any of the databases, data stores, data repositories, or other memory or the like described herein as well as combinations of the foregoing. In general, the journal of operations may include an accumulated record of human and machine interactions with a project, which may in turn be rendered as a knowledge graph or other visual expression of the information stored in the journal of operations. For example, the journal of operations may include a record of one or more human interactions and one or more machine interactions with a visual expression in a display such as one or more documents, one or more concepts, so forth. The data store may be a remote data store accessible by the device through a data network, and may be shared, private (e.g., secured against access by other users), or some combination of these. In another aspect, the data store may be a local data store on the device associated with the display.

The processor of the device may be configured to support creation and use of the journal, along with related functions such as generating or displaying visual expressions of the journal of operations. For example, the processor may be configured to render a visual expression of a project in the display based on the journal of operations, and the processor may be configured to receive a user interaction with the visual expression in the display. In order to maintain the journal of operations, the processor may be configured to add the user interaction to the journal of operations. Where, for example, the data store is local, the processor may directly execute a process or the like that adds records to the journal. On the other hand, where the data store is a remote data store or the like, the processor may cause the device to transmit suitable instructions and other information to the data store to create a record of the user interaction in the journal of operations at the remote location. The processor may also perform other related functions, such as to request a recommendation associated with the user interaction from a recommendation engine, which may be a local recommendation engine executing on the device or a remote recommendation engine accessible through a data network, and to add a response by the recommendation engine to the journal of operations.

The visual expression of the project rendered in the display may take any suitable form. This may, for example, include icons or vertices forming a knowledge graph. This may also or instead include summary cards providing excerpts of documents as described below, mention highlights or other visual indicators of potentially relevant content within documents, and summary information about mentions, concepts, and the like. More generally, any visual expression of records in the journal of operations that usefully presents information to a user and/or facilitates user input relating to a project may usefully be employed within a visual expression of the project as contemplated herein.

The systems and methods described herein may be employed to support computer-assisted research and knowledge discovery. In general, this is supported by a system 700 including various architectural features described herein. For example, the knowledge graph or similar construct facilitates human understanding and interaction with a corpus of documents 710 through an explicit visual representation of interrelated concepts, along with convenient access to supporting documents and text, within a user interface 702 of a user device 704. At the same time, a machine analysis system 706 including, e.g., a recommendation engine, search engines, and so forth facilitates the discovery of new relationships and insights based on the relationship of entities and concepts within an available corpus of documents 710. The human and machine interactions with this knowledge graph may be supported by a journal of operations 708 or similar data structure that preserves a context and history for the knowledge graph that can be aggregated in a manner that supports sharing and collaboration among human users on one hand, and improved contextual analysis by machine algorithms on the other hand.

Further features and aspects of a machine-assisted knowledge discovery platform using this architecture are described below, beginning with a number of representative descriptions of terms used herein.

As used herein, a recommendation engine may be any system or method that interprets contextual information from one or more human users and responds by recommending content from a corpus of documents based on an algorithmic prediction that a user will choose to act on the recommendation, e.g., by opening and reading a recommended document.

A "user" is a human or computer process that interacts with a tool, such as program, web service, or a display.

A "collaborative agent" also known as an "intelligent assistant" or "intelligent virtual assistant" may be any software system that interacts with a user through one or more channels of communication, such as voice dialog on a telephone, a data feed, electronic mail, or text messages in a chat application. Typical collaborative agents have focused on the limited scope of a single channel. In this document, we use "machine-based user" interchangeably with "collaborative agent," because both humans and collaborative agents are users of the knowledge operating system (KOS) contemplated herein.

A surface, as used herein, may include any medium for communication with a user. Surfaces may include any devices, screens, application windows, acoustic environments, vibrating actuators, and any other sensor-actuator mechanisms for interacting with a user. A widely used type of surface is an application window in a computer, such as the web browser, Microsoft Word application, PDF viewer, or other program through which a person might read this document. A "visual surface" may include any such surface with a visual component.

Typically, human users use several surfaces throughout the day. For example, it is common for a person to have an email program and a web browser open at the same time on a laptop computer, and also to have a mobile phone open at the same time with a chat dialog underway. These many surfaces carry tremendous value for machine learning algorithms to understand what a user is doing. From this context, a collaborative agent can attempt to infer what the user needs next.

To "recommend content," e.g., by a recommendation engine, means to attempt to help a user access content that the user may not have previously realized or recognized would be helpful to the user. One typical objective of content recommendation is to provide sufficient information in the recommendation display to characterize the potential utility of a piece of content that is being recommended. This context surrounding the recommendation may help a human user to recognize the benefit of accepting or using a recommendation.

"Knowledge" as contemplated herein includes at least concepts and relationships between concepts. This may include relationships between entities, which are a special type of concept. An "entity" may be distinguished by strongly typed attributes, such as hometown, phone number, number of stories, and DNA. Named entities have a given name, generally not unique. Pronominal mentions of entities refer to an antecedent; e.g., him, you. Nominal mentions of entities describe a particular entity without providing a name, e.g., "the general" or "the three journalists." Examples of entity classes include: person, company or organization, facility or building, vehicle, device or cyber identifier (e.g., phone number, skype handle, email address, IP address), chemical compounds, planetary objects, and proteins.

A "document" is a digital media object containing mentions of concepts. Non-digital records, such as the printed form of a document is merely an artifact and not a document in the sense of the word as generally described herein. Documents appear in many contexts. This may, for example, include source documents that a user might use as reference material, and working notes that a user is creating, such as a reply in an email thread.

Software systems frequently interact with mentions in various forms, and therefore described herein are some concepts and terminology for identifying mentions. A "surface form" is a string of character or a sequence of sounds or set of pixels in an image or another raw data representation that at least some users would recognize as referring to a concept. As stated above, the position is taken that a concept is only defined by its surface forms in context. Thus, to identify a concept, one must identify a document and a portion of the document that is a mention. Many documents contain rich structure, such as hierarchical headings and tables, and these may be used to identify portions of a document. Often, surface form mentions are specific sub-ranges of characters or pixels in a document, and these ranges are often called "spans." Many algorithms have been developed for automatically selecting mention spans from documents.

A "corpus of documents" is a collection of data files, such as images in the Portable Network Graphic (PNG) format, or Microsoft Word files in the .docx format or Portable Document Format (PDF), or web pages written in the Hyper Text Markup Language (HTML), or any of the many other data formats. The documents in a corpus can contain a wide variety of digital media, including images, video, audio, text, time series, numerical matrices, or any other information expressible in binary form such that it can be transmitted between computer systems. Even paper documents can be represented in a corpus by scanning the paper to make images, which can then be converted to text by optical character recognition or the like. A corpus of documents may be unbounded in size, such as the public Web, where new documents are created very frequently.

Textual documents often contain words that can be spoken in audio documents. Such speakable information is often called natural language, because its structures are natural phenomena that emerged through human discourse before the age of computers. Other data in documents describes structured information for interpretation by machines, such as hypertext markup language (HTML), which contains tags telling a web browser how to display information. A typical web page contains both structured HTML and also natural language.

A widely used technique for identifying mention spans in text is to describe the entire text of the document as a single contiguous array of characters or Unicode code points. A mention span can then be uniquely identified by its start and end index in this array of code points. Even a document with rich structure can be serialized to a single string. For example, a web page can be represented as HTML, and the string from of the HTML document can be used as the single contiguous string of a document. In order to run multiple mention span selection algorithms on the same document, it is often useful to ensure that their identifiers use the same array of code points. This makes it easy to detect when different algorithms select the same or overlapping mention spans, and it enables the ordering of mention spans to be preserved even when different algorithms select the spans. For example, one could run both a regular expression for detecting email addresses and a statistical sequence labeling model, such a skip-chain conditional random field model, and by running these on the same underlying array of code points, the mention spans selected by the two algorithms can be combined into a single set. If a particular algorithm cannot properly handle HTML markup tags, then those tags can be replaced by a whitespace code points such that the array positions of subsequent natural language text are unchanged. The present disclosure may refer to the index positions in such an array as "character offsets." For example, if the present disclosure treats the letter "W" in the previous sentence as position zero, then the word "refer" has character offsets [9,13] inclusive, or [9,14] where the end index position is not included in the mention span.

Universal resource locators (URLs) are widely used to identify documents in network connected systems, such as the world wide web (WWW) and other content management systems (CMS). As defined in various standards document, such as IETF RFCs (https://tools.ietf.org/html/rfc3986 and https://tools.ietf.org/html/rfc1738), a URL provides a communication "scheme", a "hostname", and a file "path" for accessing a document. A URL may include additional data elements, such as query parameters and hash fragments. Practically, URL strings are often variable length and can therefore cause operational issues in software systems. A common technique for coping with these problems is to apply one-way hashing functions with low collision rates, such as MD5, SHA1, or SHA256, that generate fixed-length strings that can be easily expressed in hexadecimal. Since hashes collide extremely infrequently, they are often used as though they are a unique identifier for a document. The present disclosure refers to such hash-based identifiers HashDocIDs, and generally any kind of string-based identifier of a document as a "docID."

A textual mention can thus be identified by a combination of a docID and character offsets identifying the beginning and ending of the mention span within that document. Such a combination is called a "mention identifier" or "mentionID." For example, consider again an example sentence that begins "We often refer . . . ". Imagine a document containing only that one sentence, and suppose that document has the URL "file://server/doc.txt" for which the MD5 hash is da98292ac64ea61dc4706dac2a48881a. Thus, a mentionID for the word "refer" in that document is "da98292ac64ea61dc4706dac2a48881a:9,14", where a colon is used to delimit the docID from the character offset begin and end.

Analogous considerations provide usefully concrete identifiers for subimages in pictures and video, and utterances in audio tracks. Such identifiers of mentions are referred to as mentionIDs. Entities are a subset of concepts, and therefore an entity is identified by its mentionIDs. For the purpose of describing embodiments herein, mentions are the only materialization or manifestation of entities that would need to be described or addressed. For clarity, to refer to a mentionID of a particular entity, such as the singer Black Frances, the system could write "MentionID(Black Francis)". This can make it simpler for constructing clarifying examples that use about mentionIDs.

A relationship may be a kind of attribute of an entity. A relationship may be identified by two entities, which are concepts, and therefore substantiated by mentions—at least one mention for each of the two entities. That is, a pair of mentionIDs may be necessary information for identifying a relationship.

A relationship can be described as having a "type" that is defined by a special kind of document that is often called an ontology. The mentions of various concepts in an ontology, such as "member of" may be used to describe relationships between entities, such as "Black Francis was a member of The Pixies." The two-tuple of (MentionID(Black Francis), MentionID(The Pixies)) may be a more fundamental object. To refer to a relationship with a type, one can identify both the two-tuple that identifies the pair of entities as well as an identifier for the ontology document and the portion of the ontology that defines the type of that relationship.

A document that substantiates a relationship between two concepts can provide evidence of the type of the relationship. For example, consider a journal article describing how Vitamin C can help a human body fight off viruses that cause the common cold (an illness). Such a document provides evidence of the relationship between the concept "Vitamin C" and the concept "common cold." Mentions of other concepts in that document provide context that characterizes the relationship.

Coreference resolution or "coref" is the process of assigning meaning to mentions. This process can take place in a human or machine-based agent that interprets mentions. The process may reduce ambiguity by asserting that some mentions refer to the same concept, i.e., are co-referring. This reduction of ambiguity is experienced by the actors as assigning meaning to each mention. This is subtle, because nobody may have direct access to meaning or truth. Instead, truth from evidence may be inferred. Thus, the literal idea of assigning meaning may be unobtainable. Instead, an operationalizable notion of disambiguation is coreference resolution. If an actor believes that a particular mention is referring to the same concept as another mention, then the actor believes that the two mentions are co-referring or co-referent, i.e., have the same meaning. One says "I understand X" or "I know the meaning of X" when one has associated X with other concepts through coreference resolution and awareness of some of its relations. To connect a mention to other mentions of the same concept is to resolve its meaning, or to "coref" it, after which it has been "coref'ed."

Coref of an agent carries extra weight because it identifies the actor. Identity can have many practical implications for actors in the real world. Since many online cyber actors cloak their identities, the special term persona may be used to refer to an online actor that another actor may not yet have accurately coref'ed to other personas.

In discovering information about concepts and entities, one may encounter several types of documents. This may, for example, include a "primary source" document that is usually an artifact created for communication between actors contemporaneously with various events, e.g., a photograph of an event or a transcript of an interview. This may also include "secondary sources" that analyze primary source documents, usually during subsequent events that depend on or focus on the previous events, e.g., a typical intelligence bulletin, such as a single-source report documenting a single primary source document, such as an interview with a person or a scan of a paper artifact. Newspaper articles are a common example of secondary source material. A "tertiary source" generally compiles information from secondary source documents to provide a summary or condensation of those analyses, e.g. properly written encyclopedia articles, such as many Wikipedia articles.

As used herein, a context may be a portion of a document that enables or helps a person to understand the intended communication of mentions within that context. Context is variable. Generally, including a larger portion of a document as context will enable the reader to understand more. On the other hand, larger context requires more time to digest by a human reader, and to process by a machine. For example, a snippet of text in a search result listing is intended to give the reader enough context to efficiently decide whether or not to open the link to access the full document. It will be understood that, as used herein, context may also include a user or computer context in which an action is taken. This may, for example, include a device or application making a request, and any other observable physical context (time of day), computational context (network address, executing process, etc.), research context (location in a knowledge graph, type of information request, etc.), and so forth.

A citation is a reference to a document. A URL is a kind of citation. However, a citation may also or instead provide any information for a reader to disambiguate a specific version of a document. When a document contains a citation to another document, the context of the citation may indicate some concepts that are mentioned in both.

This system contemplated herein may employ a utility function that, in general, can be adapted to mimic an implicit utility function of a user evaluating sources for potentially useful information. In one aspect, this may dynamically mimic the research activity of a particular user so that a machine can collaborate with the user by dynamically optimizing a utility function that tracks with the user's utility function.

This may include capturing (in-document) contexts around mentions, and further capturing feedback from a user about whether a particular mention advances the user's interests. This means that the software agent's utility function may be defined by a user's current working context. Specifically, the software agent's objective function may be to find evidence of relations between entities mentioned in the user's working context and other entities that are not yet in the user's working context. By dynamically reranking such related entities and related content, the system may encourage the user to add (cite) those documents into the user's current project. A recommendation engine or other computer-assisted discovery tool as contemplated herein may thus mimic human processes of querying remote systems, retrieving documents, digesting content, corefing entities, and looking to fill gaps between a human collaborator's working context.

A knowledge graph or other visual representation may usefully employ a variety of visual display elements. In one aspect, this may include vertices that represent documents or concepts (e.g., as icons), along with edges that represent mentions among documents and concepts, such as mentions substantiated by the content of various documents. A variety of additional, useful visual display elements or visual knowledge elements are discussed below.

1. Mention Highlights in Context: closest to the text may be visual highlights, which are widely used in the field of text display systems. Visual highlights may change the color or tint contrast or other visual aspect of the characters in a span of characters that make up a mention span of interest for some purpose. Highlighting may also or instead be used on images, where outlines of shapes or polygons can be rendered on top of an image to identify subimages or other image content of interest. Audio tracks may be segmented with subsegments identified by any suitable visual, audio, or textual (e.g., through annotations) means. Highlighting of mentions of concepts in video may also be straightforward, e.g., with a visual and audio indicator. For in-context mention highlights, a full source document may be loaded into a viewer or editor. This is generally the native form of the document. For example, a web browser can display an HTML web page or PDF document loaded from some URL, and then highlights can be injected into the document object model (DOM) of the document. For example, one suitable highlighting tool is described in the HTML Highlighter project created as part of DARPA Memex and open sourced on github at "dossier/html-highlighter." This is an example of a tool that injects highlights into the context of a document. Other highlighting tools are publicly available and various resources and techniques for highlighting suitable for use in highlighting concept mentions within documents will be readily appreciated by one of ordinary skill in the art.

2. Summary Cards: lists of search result snippets are a familiar form of what is called "summary cards in a queue." Other familiar forms of summary cards are draggable cards in a Kanban-style work board in Trello or Jira or Zenhub, and addon to GitHub. Such card-based displays may show a portion of content that is either extracted from a document or created as an abstract by a summary-generating algorithm and displayed so that a user can see a representation of a document with a subset of the concepts mentioned in the document highlighted to the user in a compact form. Typically, this compact form enables the user to look at a representation of many documents simultaneously in one view on a visual display. For example, a summary card can show surface forms of one or more concepts mentioned in a document, or in several documents. A summary card can represent multiple documents; for example, a card can show that several documents all mention the same two concepts together, thus providing evidence of a relation between the concepts. A summary card can also show images or subimages or portions of videos or sound tracks. The phrase "snippet" may be used to refer to the portion of content extracted or abstracted from a document and displayed in a summary card. A visual display of summary cards might be displayed in a list, or in tabs, or a multi-column display. A list of summary cards may be referred to as a "queue" because user actions on the cards can triage the list by removing cards from positions near the top of the queue.

3. Vertices in a Graph: one can render a visual representation of information from documents in a collection of icons or symbols connected by lines. The icons in such a graph display can represent particular concepts or collections of concepts. An icon can represent a document or particular edition or version of a document, a snapshot of content from a URL at a particular time for a particular requestor, or any other document or portion of a document. An icon can also or instead represent a concept based upon a collection of mentions from one or more documents. For example, the present disclosure mentions the concept "graph" and a visual display of this relationship can be depicted as vertices in a graph by rendering a document icon with a line connecting it to the concept vertex labeled with the surface form "graph." The labeling on a graph may provide visual context for users in much the same way that in-context highlights and summary cards provide context for users. The lines in such a graph display can have various visual qualities, properties, labels, and other semiotics. For example, the line connecting a document icon to a concept mentioned in the document could be a dashed line with an arrow head pointing at the mentioned concept. A line connecting to concepts that are mentioned together in a plurality of documents could be depicted as a solid line or colored line with various meanings assigned to different colors.

In-context highlights may identify mention spans in context. Summary cards may identify mentions that are of interest (or potential interest) in views that depict a plurality of documents. A graph may use vertices to represent concepts/mentions and documents, with edges depicting relationships among these items. All three levels of visual abstraction may be referred to herein as visual knowledge elements, and may support display of knowledge/information as well as user input such as input that identifies mentions of interest, dismisses mentions that a user decides are not interesting, requests recommendations, and so forth. These same visual knowledge elements may also enable automated or computer-based interaction with a knowledge structure and support operations such as machine-based selection and presentation of mentions of possible interest to users and dynamic updates to a presentation of mentions within a user interface or other visual context. In general, these various visual knowledge elements that the system can display to users are aggregations generated by a client application processing the knowledge operation records (KORs) from a journal. For example, a queue of summary cards may be constructed by a user interface display application processing the operations from the journal. Thus, more generally, the knowledge operating system as contemplated herein may support organization of relevant actions and documents into a journal of operations, along with various expressions of the resulting knowledge structure using aggregations of data in the journal.

The foregoing visual elements may support the presentation of information in a knowledge structure. The system may also include controls to support various actions in this context. For example, buttons or other controls such as drop-down menus, drag-and-drop operations, dials, sliders, and so forth may be used to enable users to request actions. For example, an email program might present a button labeled "compose" that opens a new draft email document or "send" for sending an email. Such visual action buttons may be distinct from visual knowledge elements in that the former are labeled by the action that they offer to initiate for the user, and the latter are labeled by source data that the user can read or access.

In one exemplary implementation, a visual action button such as an icon may be displayed when a user brings a mouse pointer near a mention span that has an in-context highlight, and if the user clicks the icon, then the system may activate additional processing for that mentioned concept. A user may also select a span of characters, imagery, audio, or other digital media, even if it was not specifically identified by a visual knowledge element. If a user selects such a custom mention span, then the system may also display a visual action button so that the user can initiate actions based on that user-selected span.

In one aspect, context tracking may be used to facilitate knowledge discovery. A machine-based collaborative agent may track a working context of a user by receiving user actions from a plurality of documents. This tracking may be recorded in a journal of operations as described herein, which may, for example, be implemented as an append-only log of knowledge operations, where a knowledge operation is any action that a human or machine-based agent might take within a corpus. In the following discussion, this journal of operations is also referred to as a "knowledge operations journal," or "KOJ." Such a journal can be implemented by defining a list of known operations and then recording observed operations in a database with a timestamp. As described above, each record may also or instead include user context and other information related to the recorded operation. That database of timestamped operations thus defines a project, which is sometimes equivalently referred to as a "knowledge project."

As a significant advantage, a knowledge project implemented in this manner may permit user activities related to a knowledge project to be tracked together across multiple documents, applications, devices, and so forth. This may also enable the different kinds of visual knowledge elements described herein to be synchronized and coordinated. For example, consider a user who may have one or more documents open in a web browser, like Firefox, and also one or more documents open in Microsoft Word, and also one or more emails open in Outlook and also other emails open in a Gmail client, and also other files open in other tools. If the user invites a collaborative agent such as the recommendation engine or other machine-assisted tool into several of these documents, then a knowledge project can track the concepts mentioned in these documents and can react to user actions. This may also incorporate user actions on other devices such as a tablet, a smartphone, and so forth. A user can also initiate multiple knowledge projects and add various documents into the various projects. A document can be in one or more than one project, and multiple users and/or machine-based collaboration agents may share a project.

Adding a document to a project may be an operation on a corresponding knowledge operations journal. In one exemplary implementation, the OpDocumentAdd operation triggers an algorithm of a collaboration agent to automatically analyze the document to select mention spans and add concepts to the project with OpConceptAdd operations.

User Actions

Examples of user actions on visual knowledge elements may include the following.

1. Positive action: a user can select a mention for tracking. Such an action could be received through several different visual knowledge elements. A user could click an in-context highlight or a visual action button displayed near a highlight. Similarly, a user could click a summary card that mentions a concept mentioned in a summarized document. Similarly, a user could click a vertex in a visual graph.

2. Negative action: a user can reject a proposal from the collaborative agent by clicking a visual action button on a summary card, which may be labeled with a description of the action, such as "wrong entity" or "not interesting."

Similarly, a user can reject red-colored in-context highlights to tell the algorithms that a particular proposal was not helpful. Similarly, a user can discard a vertex in a visual graph display. A particular implementation may offer multiple discard actions, thus allowing the user to communicate more about their feelings on a given vertex or edge or piece of evidence.

3. Neutral discard action: a user can prune automatically generated visual knowledge elements without having to tell the system that they are wrong. These non-positive-and-non-negative actions may allow the user to clean up the visual field by deactivating highlights, removing summary cards, or removing vertices or edges from a graph display.

4. Process initiation actions: specific command and control processes can be exposed to users on visual knowledge elements. For example, an exemplary implementation could provide an "autobuilder" button that allows a user to tell the system that they are interested in a particular set of multiple concepts, and thus request that the collaborative agent do all available exploration actions on those concepts.

5. Exploration actions: a machine-based user may act on a mention by automatically formulating queries that use the surface form of the mention or mutated variations of the surface form or alternate words derived the mention, and sending these queries to remote search engines to retrieve documents that it can put through the various tiers of indexing described below and ultimately recommending that some of the mentions from those documents be added to the project.

6. Recommending Mentions: a machine-based user may act on a mention by recommending other mentions that it estimates are likely to be coreferent.

7. Recommending related entities: a machine-based user may act on a mention by recommending mentions of other entities that co-occur with mentions that are likely to be coreferent with that mention.

8. Recommending actions: a human-based or machine-based collaborative agent can recommend and undertake a very wide range of actions. In one aspect, actions proposed or undertaken by a machine-based user occur in response to mentions.

In general, user actions may be added to a knowledge operations journal. This may enable a machine-based collaborative agent to apply algorithms to maintain a history of the dialog with a human user about the knowledge or actions that they seek. The journal may enable the machine-based tool to better infer the user's intent in a manner that advances the user's research objective(s).

A set of positive and negative actions may include indicating that two mention spans are or are not the same entity. For example, when a summary card identifies a mention span from a user's document, such as the mention of a person named John Smith, then the collaborative agent algorithm might find a mention of "John Smith" in some other document and present a summary card about that document. From reading the context information provided in the summary card or in the full-view form of the other document, the user might decide that the mention in the other document is not referring to the same person as the John Smith mentioned in the user's document. To indicate this "wrong entity" assertion, the user can click a button showing a minus sign symbol. The machine can use this feedback to improve its coreference resolution processing in future processing. Conversely, if the user decides that it is the same person, then the user can provide this as feedback to the machine by clicking a visual action button showing a plus sign symbol. Such actions may create positive and negative coreference assertions stored in operations in the knowledge journal.

The system may infer a coref assertion from other user actions. For example, continuing the John Smith example above, consider that the user is editing an in-progress document, such as a draft email, and uses the summary card about the other document to create a citation. Such a citation action may be recorded in the knowledge journal by an operation, which may be named OpCitationAdd. In subsequent processing, the system can interpret that operation as meaning that the user also believes that the John Smith mentioned in the other document is the same John Smith to which the user's document also refers, i.e., that the two mentions are coreferent.

Index Tiers

Several data structures and indices can be used in combination to provide document search, concept search and association, tracking of a live knowledge structure, and so forth within a knowledge operating system as contemplated herein. Other aspects of the knowledge operating system such as a knowledge graph, recommendation lists, edge or vertex information, and the like may be created by aggregating records from these indices, and in particular, from the tier3 index described below that stores a journal of human and computer actions across multiple surfaces.

The "Tier0 index" may be a standard index of the full contents of each document in the corpus. In one aspect, this index (or indices) can provide fast methods for looking up and retrieving documents. For example, reverse indexes may enable so-called "full-text" searching that supports keyword and phrase queries to find documents that mention words or phrases input by a user. A key-based index may enable lookups based on exact-match lookups of particular values associated with a document, such as metadata. The use of these technologies with documents and the knowledge operations journal may enable advantageous capabilities of the knowledge operations journal as describe below. As used herein, a "standard index" refers to either or both of a full-text and key-based retrieval technology.

The "Tier1 index" is a standard index of each mention chain subdocument. Additional feature data may be computed by NER and other mention selection algorithms, and these mention spans are used as part of the context indexed with each mention chain subdocument, thus enabling more sophisticated retrieval queries, such as efficiently retrieving documents that mention two names near each other. Named entity recognition (NER) and other natural language processing (NLP) tools are widely used in the art to generate metadata about documents of all kinds. Algorithms are available for segmenting the stream of data and labeling mentions of concepts and entities in text, images, audio, and video. A system may use these enrichment algorithms to identify sets of mentions of interest in documents, which are referred to herein as "mention chains." These can be built into "mention chain subdocuments," or MCs, around particular mentions. These subdocuments contain the context surrounding the mentions, so that a user (human or machine-based) can understand the meaning of the mentions.

The "Tier2 index" is generated by an algorithm called hierarchical agglomerative clustering (HAC), which groups together mention chain subdocuments into nested sets of mentions. Sets closer to the leaf-level in the hierarchy may contain elements that the algorithm estimates to be more likely to be coreferent. For example, two mentions that have the same surface form name are candidates for possibly referring to the same concept. If the contexts surrounding those two mentions are similar, then a human is more likely to perceive the mentions as having the same meaning, i.e., as being coreferent. An algorithm can compare the data in the contexts surrounding the two mentions and estimate the likelihood that a human would perceive the mentions as coreferent. The tree structured generated by HAC may provide a fast lookup data structure for finding mentions of the same concept. The tree structure may be stored as key-based metadata on mention chains subdocuments. For example, if an MC is assigned to leaf set 34 that is contained within subset 97, which is itself contained within subset 104, which is itself contained within subset 14, then that MC's tree address is [14, 104, 97, 34], which is an ordered set of keys. These keys are stored on the MC record in the search index as retrieval keys for fast lookups.

The model may define thresholds of likelihood of coreference for each nested set. For example, the set defined closest to the leaf level may be 90% likely, the next 80%, the next 70%, and so on. Sets farther from the leaf level may be more uncertain. Referring to the example above, another leaf with a tree address of [14, 104, 3, 402] has a least common ancestor (LCA) in set 104, and would therefore be 70% likely to be coreferent.

This may enable efficient retrieval as follows: after HAC has operated on a collection of mention chain subdocuments, including at least one that comes from a user's document, then other mentions that are likely to refer to the same entity mentioned in the user's document are retrievable by requesting documents that share an ancestor key.

The Tier3 index may enable collaborative synchronization across a user's many windows, applications, devices, and fellow knowledge workers. In general, the Tier3 index may include the sequence of records of user actions, including one or more human users and one or more machine users across multiple surfaces, as stored, for example, in a journal of operations or similar data structure. Various features of the knowledge operating system, such as display of a knowledge graph or associated visual display elements such as cards or lists, may be derived using aggregations of the Tier3 index.

Actuator Frameworks

Actuator frameworks may enable the system to find data and pull it into a project.

Metasearch is one particular implementation of an actuator framework. Metasearch crawls the so-called deep web by pushing queries into search form fields on database-backed websites and retrieving documents from the links in the search results returned by the database-backed index. Metasearch processes the history of an operations journal to find mention strings and formulate queries from those strings. The metasearch actuator may enable collaborative agent algorithms to push those query strings into search engines, such as those for federal agencies (e.g., the Securities Exchange Commission or the U.S. Patent Office), commercial databases, and so forth, to discover documents. This process may be automated to obviate the need for human action and supervision. By automatically following the links returned in the search engine results pages (SERPs), the metasearch actuator framework may obtain additional documents that it can add to the project.

Another example of an actuator framework is our active wikifier system. A wikifier is an algorithm that links mentions of entities to a reference knowledge base, such as a wiki. A system as contemplated herein may dynamically respond to mentions that users add to a project by metasearching for profiles in well-known reference sources and social media, so that it can link the user's mention to those external sources. The system may use a cache of common wikification targets, so that it does not need to metasearch for the most common concepts. However, a dynamic wikifier actuator framework may enable collaborative agent to keep up with the evolving state of the wiki resources throughout the web.

Knowledge Operating System

A knowledge operating system (KOS) is a content management system (CMS) that facilitates various actions on KOJs, also referred to herein as "projects." A user can create a new project, give it a name, and add mentions from documents to the project. Each project has a separate manifestation in a serializable data structure that can be stored on disk persistently. In this way, a project is like a new kind of document. In the same way that traditional documents can refer to other documents via citations or structured references, such as URLs, a KOJ can also contain references to many other documents. Unlike most other kinds of documents, a KOJ may track user actions related to the documents to which it refers. Unlike any other kind of document, a KOJ may enable algorithms to use those tracked actions to automatically expand the KOJ itself.

A KOS may provide programmatic interfaces, such as Representational State Transfer web services that transmit JavaScript Object Notation, that enable client programs to interact with surfaces, so that user actions on other documents can be tracked. A KOS may also provide actuator frameworks that enable automatic algorithms to retrieve documents and data from disparate data sources so that they can be added to a KOJ. The KOS web services may enable multiple surfaces to display visual knowledge elements that render information from the same project. The various surfaces can repeatedly poll the KOS interface or the KOS may use a protocol that enables it to push changes to the journal.

The KOS may advantageously enable users to control and manage projects across devices and applications, and to collaborate on knowledge discovery with human and machine resources. Unlike search history in traditional search engines, the KOS may enable users to have multiple simultaneous projects underway. The user can choose where to record exploration actions, so that each project accurately tracks the users BDI for a particular area of activity or endeavor. While one could attempt to infer which project a user is pursuing from just looking at the user's clicking and similar actions, this is not how a human would work with another human. If two humans are working together on various projects, then it is common for one person to tell the other person which project he/she is thinking about. One often hears teammates or colleagues say "let's switch topics to the other project now . . . " or "as you'll recall, for this upcoming meeting the important factors are . . . " and other context setting statements. Thus, a user may generally specify a project. In another aspect, the KOS may infer a project, and/or switches between topics, either transparently (e.g., without user notification) or interactively (e.g., with explicit user notification and request), or some combination of these.

Most human users of computers today are accustomed to manipulating computer software as though it is an unthinking inanimate tool. With the emergence of algorithms that enable intelligent virtual assistants, software may need the ability to solicit and receive such project context setting signals from human collaborators. The KOS may enable such context setting.

In one implementation, each user action is recorded in a KOJ. User actions occur on surfaces, such as MS Word or a tab in a web browser. User actions may be captured by software plugins running inside these applications or by screen image capture software running in the parent operating system. Some exemplary implementations of the approaches to setting context are described below.

To enable users to specify which KOJ will receive actions, the KOS may display a visual action button for selecting the KOJ. In one implementation, a separate such visual action button is displayed for selecting a project in each web browser tab, e.g., in Chrome or Firefox, or a single visual action button for a surface or device. The KOS may be deployed as a desktop application or the like on particular user devices, and may enable a user to invite a machine-based collaborative agent into each document, application, window or the like. In one aspect, a user may drag-and-drop an icon representing each new document into a different project, or an icon representing a project into each new document, window or application that the user wishes to be associated with the project.

In one aspect, a user may activate automatic project switching, e.g., in a software preferences panel for a KOS desktop application. When this switch is set to ON, then when the user selects a project in one window or application, then all of other documents or windows associated with a KOS project that are open elsewhere may also switch to that project automatically. This may save the user to trouble of manually switching each window to the new project. This auto project switching may have the downside that it makes it more difficult for a user to have multiple projects active at the same moment, so the auto switching feature may be easily disabled, or a conditional switching feature may be provided in which a user is queried about whether to switch other windows or documents to a new project when the new project or a project switch is detected.

In another exemplary implementation, a user can select documents from a list of search results and click a button for "add to project." The system may display a selector showing the names of existing projects, so the user can select which project will receive the mentions from the selected document. The system may also enable the user to start a new project. In this workflow, when the user clicks to confirm which project or names a new project, the system may automatically take two actions: (1) it opens a draft email to help the user share the project with colleagues, and (2) it opens a vertices in a graph view of the project including documents and other vertices. When the graph view opens, if the user identified mentions or strings as part of their search process, then vertices for those concepts may automatically expand to show related concepts.

The system may offer a project dashboard that shows a summary view about each project. The summary view may list some of the documents and concepts in project and offers a link for opening a vertices in a graph view of the project. In one aspect, projects can be shared such that multiple users are participating in a single project. For example, two human users and two different software systems can contribute operations to a single journal.

A journal as contemplated herein may be a living document in the sense that it can continue to accumulate new operations. Like other living documents, a journal can be forked to create a copy that subsequently diverges from the original. A journal can also be locked so that new operations cannot be added. Journals may have several forms of access control permissions. The users who can access a journal with read-only permissions can be defined by one set of access control permissions, and the users who can access a journal with write permissions can be a different set of access control permissions. A set of "owner" users can be defined with the power to change the read-only and write-enabled lists of users.

To empower collaborative agent algorithms to act on behalf of users, the journal can be given access control permissions for an agent to use. These access permissions can be called the "journal's access powers." Such permissions may require that they come from a user who has control of the journal, because the journal is not to be an attack vector for a malicious user to gain access to data that the user himself/herself could not access. A journal may allow users to assign specific access powers to several of the collaborative agents operating on the journal.

For example, when a user starts a project from documents found in a list of search results, the user may have been utilizing a set of access permissions to execute that search. By default, those same access permissions could be granted to the journal as its access powers, so that collaborative agents reacting to the data in the journal can continue searching for related content to expand the project on behalf of the user. Since the user may wish to share the project with other users, the KOS may enable the user to select a more restricted set of access permissions for the journal's access powers. This way, the other people invited to the project may not gain access to all of the same data that the original creator of the project could access.

For example, the original creator of a journal may have invited a collaborative agent to read and index all of the user's email. When the user decides to make another journal around a particular issue, then the user can limit the permissions that that journal can use such that other people invited into that project cannot access the user's email through the journal.

In another aspect, the journal may be configured to support asynchronous modifications by multiple users. The following example provides details on an example embodiment of a user interface for a collaborative, machine-assisted knowledge discovery using a graph of entities and relationships. When a user double clicks on a concept vertex to request more concepts related to that vertex, the following series of events can occur. First, the user interface may, e.g., through a desktop application or other local software agent supporting display of a knowledge graph, request related concepts for a vertex from a machine analysis system 706. The machine analysis system 706 (or other suitable backend supporting the KOS) may spawn a work unit intended to complete the request for both finding related concepts and adding them to the graph. This work unit executes asynchronously. The machine analysis system 706 may commit the request to its operation log in a manner that includes a timestamp that indicates when a user initiated the request for related concepts. The commit may also include an identifier for the work unit. The machine analysis system 706 may respond to the request with all operations committed to the log since a last render by the user interface 702, including the commit above. The client can use the new operation to render a loading icon over a particular vertex. Notice that since the "loading" state is part of the graph's log, this loading icon may usefully persist even if the user closes the graph and re-opens it. Since the committed operation contains a timestamp, the user interface 702 may omit a loading icon after a predetermined timeout.

Asynchronously, the work unit may start executing, and a search for related concepts may be executed by the machine analysis system 706. A write lock on the operation log may then be acquired. While this lock is held, no other process can write to the log directly. Note that this does not impact the availability of the user interface or graph for any actual or potential user. This write lock may be necessary any time a graph-wide deduplication operation is performed to prevent data races. With the lock in place, any related concepts may be deduplicated against the current graph. In one aspect, this process can be implemented by using name similarity heuristics or the like. Any new concept vertexes and evidence edges may be created in the graph by writing to the operation log. All new edges may be hidden by default. The write lock may then be released.

Asynchronously, the next time the user interface receives updates from the backend (either by polling or by another operation similar to 1-4) it may include the additional vertexes and edges added in the operation log. Since they are hidden by default, the user interface may show an indicator on the vertex that says how many hidden edges there are. When a user asks to see them, the user interface (or more precisely, a process controlling the user interface) may execute an operation that shows them.

A naive implementation of the write lock may be to acquire a table-level ROW EXCLUSIVEPostgreSQL lock in the operations journal. However, this may block write requests to all graphs instead of one particular graph. In another aspect, this problem can be addressed by setting the isolation mode to SERIALIZABLE, but this might wind up causing duplicative processing, e.g., where end user double clicks two distinct vertexes in rapid succession. In another aspect, the system may use PostgreSQL transaction level advisory locks to implement write locks on a journal to support concurrent use by multiple users.

Knowledge Operations Journal

Knowledge Operations Journal (KOJ) may be a collection of knowledge operation records (KORs). The collections may be ordered into an append-only log. This log of operations may form a record of the exploration events or knowledge-oriented actions undertaken by users of that journal.

Operational transform journals are standard in the art. Collaborative editing tools, such as Etherpad, Google Wave, Google Docs, Office 365, and Dropbox Paper use such journal structures to track edit events in the multi-person editable documents. To enable such systems to function, a subfield of computer science has merged to study conflict-free replicated data types (CRDTs). As is standard in the art of CRDTs and related operations journals, one can simplify the data in a journal by forming a checkpoint operation that summarizes the aggregate effect of the previous operations up to that point. This may enable clients of the journal to not have to re-process the entire history of operations; instead a client can start from the most recent checkpoint and update their view of the state of the journal by playing the subsequent operations.

The KOR may usefully include fields for each record of action, such as an identifier for the user that took the action, an identifier for a mention in a document from a corpus, and where appropriate or helpful, an action on visual knowledge elements that refers to the identified mention. Aspects of the KOR such as the user identifier may be used to render a knowledge graph or other visual presentation of a project in a manner that shows particular contributions by particular users. Thus, for example, where multiple human users add to a project, the vertices or edges added by each user may be color coded, flagged with a user icon or avatar, or otherwise visually coded to identify a source of a particular addition. Activities by machine users may also or instead be visually coded in this manner. Similarly, modification permissions may be contingent on the user that added, e.g., a vertex the user requesting a change to the vertex. Thus, for example, a user may prohibit, permit, or conditionally permit changes modifications to that user's entries.

In general, a user as contemplated herein may include both human and machine users. For example, a machine user may include a machine-based algorithm executing the action of presenting a summary card that mentions "John Smith," and a human user could execute the action of clicking on that summary card, e.g., to request more information about it.

By gathering collections of KORs, users, both human and machine-based, may review past actions of all users across many surfaces. Further, the actions, and actions across multiple KORs may facilitate algorithmic inference of user intent, so that machine users can take further actions that advance human research interests and/or produce more KORs on that journal.

In an exemplary implementation, the operations called "OpEdgeSubstantiateStart" and "OpEdgeSubstantiateEnd" enable relation evidence bundles. A user action expressing interest in a relation is recorded as the OpEdgeSubstantiateStart operation. This operation may carry identifiers for the two concepts in the relation for which the user would like to see evidence. The collaborative agent reacts to this operation by running an algorithm to find evidence. When it finds evidence, it stores the evidence bundle in a storage system. Then, it adds the OpEdgeSubstantiateEnd operation to the journal with a pointer to the storage location. Client programs processing the journal can then display the evidence by using the pointer to access the stored evidence. These two operations may form a group in the journal. An undo operation may carry a pointer to an operation or group of operations, so that the grouping of operations facilitates an undo. A quote operation enables a user to attach a passage from a document to a journal. This enables the user to take actions on longer portions of data containing many mentions.

By processing the journal of KORs, a process can create an aggregate representative of a history of actions by machine and human users. To construct an aggregate, the system may process the sequence of operations in the journal. A checkpoint operation can then store the result of that aggregation on the journal as a summary of some aspect of past operations. There are many possible aggregates that can be formed from a single journal. For example, one could gather all of the actions of one user into a description of that one user's activity and/or intent. Alternatively, one could use operations for multiple users to capture a group intent indicative, e.g., of a thought process or research objective of a group of users.

In one exemplary implementation, the mechanism for aggregating operations to model the intent of one or more users is as follows. The system may generate a feature vector describing the context surrounding each mention. The vector may be a part of a high-dimensional vector space where each word, phrase, or concept mentioned in the corpus is treated as dimension of the vector space. To form an aggregate for a given set of users, the system may create a summary vector. Initially the summary vector is the zero vector. The system then iterates over operations in the journal filtering for operations by users in the given set. If a KOR that passes the filter carries an identifier for a mention in the corpus, then the system may use that mention's feature vector to refine the summary vector. If the operation carries a positive user action, then the mention's feature vector will be added to the summary vector. If the operation carries a negative user action, then the mention's feature vector will be subtracted from the summary vector. If the mention carries a neutral or ambiguous or no user action, then the system may use the add mention's feature vector to the summary vector with a weighting coefficient that changes the magnitude and sign of the change upon the summary vector.

The summary vector may provide a data structure that models the user's current state of knowledge. The dimensions of the vector space that have non-zero components in the summary vector may describe the user's current state of knowledge. The dimensions with positive values may describe the user's desired knowledge. The system may use this summary vector aggregated from the journal to rank mentions recommendation and related concept recommendations. The system may generate candidate mentions and candidate related concepts by querying the Tier0 and Tier1 and Tier2 indices described above using the various strings that have positive values in the summary feature vector. If a candidate mention's feature vector has strong overlap with the summary vector, then the system can assert that the mention's context is likely to be "on topic," i.e., about what the user is studying. Similarly, for a relation recommendation, if the combination of feature vectors for mentions of a co-occurring concept have a strong overlap with the summary vector, then the system can assert that it is likely to be on topic.

Co-occurrence is a simple way of generating candidate relations. Two concepts are said to "co-occur" if mentions of the concepts appear in the same documents. The likelihood that such co-occurrence implies a meaningful relationship between the two concepts increases as the proximity of the mentions increases. That is, mentions that are closer together in the text or image or other media may be more likely to actually be related.

The system may measure overlap of these vectors using a simple dot product, Mahalanobis distance, or another pairwise kernel function or a weighted sum of potential functions that consist of a kernel applied to portions of the vectors. In one aspect, the feature vectors may be products of vectors from several smaller vector spaces. For example, one subspace is names of people that appear in the context of a mention, and another subspace is names of organizations that appear in the context of a mention.

In addition to the likelihood that a mention or related concept is on topic for a user's project, a summary vector may be used to estimate the likelihood that the mention will be useful to the user. If the user is seeking new material that the user does not already know, then the system can count the number of dimensions in the mention's feature vector (or the related concepts combination of mentions' vectors) and then also count the number of those dimensions that are not present in the summary vector. A novelty score may be calculated as the ratio of the number of concepts that are not in the aggregate summary vector to the number of concepts that are in the candidate's vector. When considering a list of many candidate recommendations, the system may also seek to diversify the candidates. This may be achieved, e.g., using any of a variety of diversification models such as maximum marginal relevance, to this specialized context where the aggregate summary vector from the KOJ can represent user intent.

One advantage to a KOJ is that different visual display elements can synchronize their presentation of knowledge to users. For example, a user may be working with a KOS that displays a queue of summary cards in each document that the user has open. A user action that discards a card from one queue of cards may cause that card to be removed from the other queues that are showing that same project. Similarly, a user may take an action that confirms interest in a proposed document that the automatic system believes mentions an entity of interest. That action may be received through some visual knowledge element, e.g., a highlight in-context in a document. Through the KOJ, other visual displays can update in response to this. For example, if the user clicks an action button on an in-context mention highlight, then a vertices-in-a-graph aggregation for that project can show a vertex for that concept with appropriate lines connecting it to other vertices.

The KOJ structure may also advantageously facilitate use of machine learning algorithms. By recording positive and negative user actions, the KOJ can provide a source of true positives and false positives for training classifiers and other trainable algorithms. Because the KOJ dynamically tracks the user and user focus, the KOJ can provide a high-quality source of training labels for a wide range of machine learning models and the like.

Quote notes may be special types of operations where a user captures a snippet of text and stores it in the journal as a snapshot of data observed. A quote note can mention other concept vertexes in the graph, which may manifest as mention edges from the quote note to the concept. A quote note can also be created when a user wants to cite a mention chain. When a user cites a mention chain, a new quote note can be created with the citation, and it may have a citation edge to the concept vertex that contains the corresponding mention chain.

One problem that may be helpful to solve in a KOS is deduplication of documents or references to the same concept. For example, consider that a user may request related concepts for two different concepts at around the same time. This request can be processed asynchronously by the back-end. When new related concepts are discovered, they may be added to the operations journal as separate operations. If some of these concepts are the same, i.e., mentions that a coref algorithm can detect are likely to be referring to the same concept—a few different solutions may be used as described below.

There are a few different high-level approaches to the aforementioned issue. One may be based on identity, which says that the process of picking an identifier for a vertex provides it with identity, and therefore, deduping happens automatically in the context of the user's graph. The problem with this approach may be that all deduping logic gets pushed into defining an identity for concepts, which often means introducing canonical dictionaries defining concepts and requiring that all documents adhere to the same dictionary, which may be impractical to implement or impose on real data.

The other approach may be to confront the dedupe problem head on. Namely, whenever a vertex is automatically added to a knowledge graph, it may be first compared with other concepts in the journal to determine whether it refers to a concept that is already mentioned elsewhere in that project. If it is, then the system could decide to either drop it completely or merge it with that vertex. The action of either dropping or merging can be encapsulated by the term "deduped."

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for recommending content, the computer program product comprising computer executable code embodied in a non- transitory computer readable medium that, when executing on one or more computing devices, performs the steps of:
   providing a first concept icon, a second concept icon, and a first visual indicator for presentation in a display, wherein:
   the first concept icon is associated with a first concept mentioned in a plurality of documents in a corpus of documents;
   the second concept icon is associated with a second concept mentioned in the plurality of documents; and
   the first visual indicator visually associates the first concept icon and the second concept icon in the display;

identifying, using a recommendation engine, a third concept mentioned in the plurality of documents;

providing a third concept icon and a second visual indicator for presentation in the display, wherein:

the third concept icon identifies the third concept; and the second visual indicator visually associates the third concept icon with the first concept icon or the second concept icon in the display based on mentions of the first, second, and third concepts among the plurality of documents; and in response to receiving a user interaction, presenting a visualization of one or more examples of a relationship between the third concept and the first or second concepts based on text from a second plurality of documents in the corpus of documents.

2. The computer program product of claim 1 wherein the first visual indicator has a visually distinguishable appearance from the second visual indicator.

3. The computer program product of claim 1 further comprising code that performs the step of creating a ranked list of the plurality of documents for presentation in the display.

4. The computer program product of claim 3 further comprising code that performs the step of presenting the ranked list for presentation in the display in response to a user selection of the second visual indicator.

5. The computer program product of claim 3 wherein the ranked list includes a ranking according to at least one of similarity to the first or second concepts or strength of substantiation of the third concept to the first or second concepts.

6. The computer program product of claim 1 further comprising code that performs the step of creating a second recommendation for a fourth concept in response to a user selection of at least one of the first concept icon, the second concept icon, and the third concept icon.

7. The computer program product of claim 1 wherein presenting a visualization of one or more examples of a relationship between the third concept and the first or second concepts comprises presenting a summary card in the display providing evidence of the relationship between the third concept and the first or second concepts.

8. The computer program product of claim 1 wherein the recommendation engine executes remotely from a client that renders the display.

9. The computer program product of claim 1 further comprising code that performs the step of receiving a user selection of a document in the corpus of documents and, in response to the user selection, providing a fourth concept icon for presentation in the display, the fourth concept icon associated with a concept in the document.

10. The computer program product of claim 9 further comprising code that performs the step of, in response to receiving the user selection of the document, creating a fourth visual indicator to visually associate at least one of the first concept icon, the second concept icon, and the third concept icon with the fourth concept icon in the display.

11. The computer program product of claim 1 further comprising code that performs the step of storing the corpus of documents in a location accessible to the recommendation engine.

12. The computer program product of claim 1 further comprising code that performs the step of storing an index for the corpus of documents, the index identifying at last one concept for each document in the corpus of documents.

13. The computer program product of claim 1 wherein the display is associated with a remote client, and wherein providing the first and second concept icons and the first visual indicator includes transmitting the first and second concept icons and the first visual indicator to the remote client for presentation in a user interface of the remote client.

14. The computer program product of claim 1 further comprising code that performs the step of storing a journal of operations include one or more user interactions with at least one of the first concept icon and the second concept icon and at least one recommendation from the recommendation engine.

15. The computer program product of claim 14 wherein storing the journal of operations includes storing the journal of operations in a persistent memory independent of a device hosting the display.

16. The computer program product of claim 14 wherein storing the journal of operations includes storing the journal of operations in a persistent memory independent of a device hosting the recommendation engine.

17. A method comprising:

providing a first concept icon, a second concept icon, and a first visual indicator for presentation in a display, wherein:

the first concept icon is associated with a first concept mentioned in a plurality of documents in a corpus of documents;

the second concept icon is associated with a second concept mentioned in the plurality of documents; and the first visual indicator visually associates the first concept icon and the second concept icon in the display;

identifying, using a recommendation engine, a third concept mentioned in the plurality of documents; and providing a third concept icon and a second visual indicator for presentation in the display, wherein:

the third concept icon identifies the third concept; and the second visual indicator visually associates the third concept icon with the first concept icon or the second concept icon in the display based on mentions of the first, second, and third concepts among the plurality of documents; and in response to receiving a user interaction, presenting a visualization of one or more examples of a relationship between the third concept and the first or second concepts based on text from a second plurality of documents in the corpus of documents.

18. The method of claim 17 further comprising presenting excerpts from the plurality of documents for presentation in the display, the excerpts substantiating a relationship of the first concept to the second concept.

19. The method of claim 17 further comprising persistently storing a journal of operations including at least one user interaction with the display and at least one interaction by a recommendation engine responsive to the at least one user interaction with the display.

20. A system comprising:

a device including a display;

a processor of the device; and a recommendation engine coupled in a communicating relationship with the device, wherein:

the processor is configured to provide a first concept icon, a second concept icon, and a first visual indicator for presentation in the display, wherein:

the first concept icon is associated with a first concept mentioned in a plurality of documents in a corpus of documents;

the second concept icon is associated with a second concept mentioned in the plurality of documents; and the first visual indicator visually associates the first concept icon and the second concept icon in the display;

the recommendation engine is configured to:

receive a request from the device for concepts related to at least one of the first concept and the second concept;

create a recommendation for a third concept mentioned in the plurality of documents; and communicate the recommendation to the device as a second visual indicator; and the processor is further configured to:

provide a third concept icon and the second visual indicator for presentation in the display, wherein:

the third concept icon identifies the third concept; and the second visual indicator visually associates the third concept icon with the first concept icon or the second concept icon in the display based on mentions of the first, second, and third concepts among the plurality of documents; and in response to receiving a user interaction, presenting a visualization of one or more examples of a relationship between the third concept and the first or second concepts based on text from a second plurality of documents in the corpus of documents.

\* \* \* \* \*